US012749201B2

(12) United States Patent
Jeon et al.

(10) Patent No.: US 12,749,201 B2

(45) Date of Patent: Sep. 29, 2026

(54) PEDESTRIAN TRAJECTORY PREDICTION METHOD

(71) Applicant: GIST(Gwangju Institute of Science and Technology), Gwangju (KR)

(72) Inventors: Hae Gon Jeon, Gwangju (KR); In Hwan Bae, Gwangju (KR); Jin Hwi Park, Gwangju (KR)

(73) Assignee: GIST(Gwangju Institute of Science and Technology), Gwangju (KR)

( * ) Notice: Subject to any disclaimer, the term of this patent is extended or adjusted under 35 U.S.C. 154(b) by 538 days.

(21) Appl. No.: 18/174,716

(22) Filed: Feb. 27, 2023

(65) Prior Publication Data

US 2023/0342948 A1 Oct. 26, 2023

(30) Foreign Application Priority Data

Mar. 15, 2022 (KR) ........................ 10-2022-0032099
Apr. 27, 2022 (KR) ........................ 10-2022-0052202

(51) Int. Cl.

| | |
|---|---|
| ***G06T 7/246*** | (2017.01) |
| ***G06V 10/764*** | (2022.01) |
| ***G06V 10/82*** | (2022.01) |
| ***G06V 40/10*** | (2022.01) |

(52) U.S. Cl.

CPC ............ *G06T 7/246* (2017.01); *G06V 10/764* (2022.01); *G06V 10/82* (2022.01); *G06V 40/103* (2022.01); *G06T 2207/20081* (2013.01); *G06T 2207/20084* (2013.01); *G06T 2207/30196* (2013.01); *G06T 2207/30241* (2013.01)

(58) Field of Classification Search

None

See application file for complete search history.

(56) References Cited

U.S. PATENT DOCUMENTS

| | | | | |
|---|---|---|---|---|
| 11,495,055 B1* | 11/2022 | Yang | .................... | G06V 10/42 |
| 2021/0155266 A1* | 5/2021 | Sun | .................... | B60W 60/0027 |
| 2022/0011122 A1* | 1/2022 | He | .................... | G06N 3/044 |
| 2023/0150550 A1* | 5/2023 | Shi | .................... | G06V 10/82 701/23 |

OTHER PUBLICATIONS

Probabilistic Crowd GAN: Multimodal Pedestrian Trajectory Prediction using a Graph Vehicle-Pedestrian Attention Network, by Eiffert et al., arXiv:2006.12906v2 [cs.CV] Jul. 12, 2020 (Year: 2020).*

Coordination and Trajectory Prediction for Vehicle Interactions via Bayesian Generative Modeling , by Li et al., 2019 IEEE Intelligent Vehicles Symposium (IV), Paris, France. Jun. 9-12, 2019 (Year: 2019).*

* cited by examiner

*Primary Examiner* — Vikkram Bali

(74) *Attorney, Agent, or Firm* — Studebaker Brackett PLLC

(57) ABSTRACT

The present disclosure relates to a method for sampling a random vector corresponding to an intention of a pedestrian non-stochastically or applying a social statistical element that the majority of pedestrians move in groups to training, in training a neural network model for pedestrian trajectory prediction.

9 Claims, 20 Drawing Sheets

FIG. 6
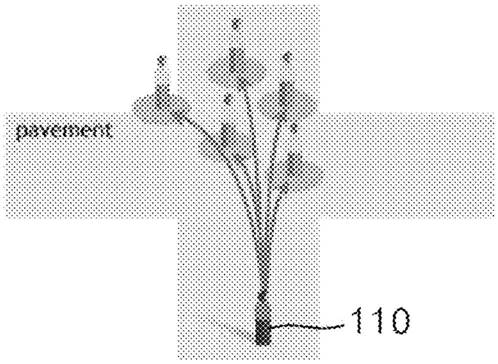
Stochastic sampling
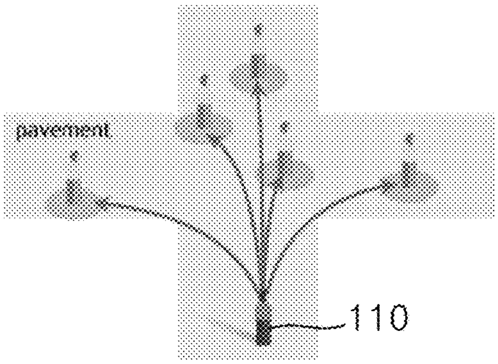
Non-probability sampling

Graph Attention Network

FIG. 11

| | ETH | HOTEL | UNIV | ZARA1 | ZARA2 | AVG |
|---|---|---|---|---|---|---|
| Social-GAN | 0.87 / 1.62 | 0.67 / 1.37 | 0.76 / 1.52 | 0.35 / 0.68 | 0.42 / 0.84 | 0.61 / 1.21 |
| STGAT | 0.65 / 1.12 | 0.35 / 0.66 | 0.52 / 1.10 | 0.34 / 0.69 | 0.29 / 0.60 | 0.43 / 0.83 |
| Social-STGCNN | 0.64 / 1.11 | 0.49 / 0.85 | 0.44 / 0.79 | 0.34 / 0.53 | 0.30 / 0.48 | 0.44 / 0.75 |
| PECNet | 0.54 / 0.87 | 0.18 / 0.24 | 0.35 / 0.60 | 0.22 / 0.39 | 0.17 / 0.30 | 0.29 / 0.48 |
| Trajectron++ | 0.43 / 0.86 | 0.12 / 0.19 | 0.22 / 0.43 | 0.17 / 0.32 | 0.12 / 0.25 | 0.21 / 0.41 |
| SGCN | 0.57 / 1.00 | 0.31 / 0.53 | 0.37 / 0.67 | 0.29 / 0.51 | 0.22 / 0.42 | 0.35 / 0.63 |
| Causal-STGAT | 0.60 / 0.98 | 0.30 / 0.54 | 0.52 / 1.10 | 0.32 / 0.64 | 0.28 / 0.58 | 0.40 / 0.77 |
| NCE-Trajectron++ | 0.39 / 0.79 | **0.11** / **0.18** | 0.20 / 0.44 | 0.15 / 0.33 | **0.11** / 0.26 | 0.19 / 0.40 |
| **NPSN-SGAN** | 0.72 / 1.26 | 0.38 / 0.72 | 0.71 / 1.43 | 0.34 / 0.68 | 0.34 / 0.70 | 0.50 / 0.96 |
| **NPSN-STGAT** | 0.61 / 1.02 | 0.31 / 0.57 | 0.53 / 1.13 | 0.34 / 0.68 | 0.30 / 0.62 | 0.42 / 0.80 |
| **NPSN-STGCNN** | 0.44 / 0.65 | 0.21 / 0.34 | 0.28 / 0.44 | 0.25 / 0.43 | 0.22 / 0.38 | 0.28 / 0.45 |
| **NPSN-PECNet** | 0.55 / 0.78 | 0.16 / 0.21 | 0.30 / 0.45 | 0.20 / 0.31 | 0.15 / **0.22** | 0.27 / 0.39 |
| **NPSN-Trajectron++** | 0.40 / 0.76 | 0.12 / **0.18** | 0.21 / 0.41 | 0.17 / 0.31 | 0.12 / 0.24 | 0.20 / 0.38 |
| **NPSN-SGCN** | **0.36** / **0.59** | 0.16 / 0.25 | 0.23 / **0.39** | 0.18 / 0.32 | 0.14 / 0.25 | 0.21 / 0.36 |
| **NPSN-Causal-STGAT** | 0.56 / 0.90 | 0.25 / 0.40 | 0.51 / 1.09 | 0.32 / 0.65 | 0.27 / 0.56 | 0.38 / 0.72 |
| **NPSN-NCE-Trajectron++** | **0.36** / 0.68 | **0.11** / **0.18** | **0.18** / **0.39** | **0.14** / **0.29** | **0.11** / 0.23 | **0.18** / **0.35** |

Baseline model + NPSN (bracketed rows: NPSN-SGAN through NPSN-NCE-Trajectron++)

Bold: Best, Underline: Second best

FIG. 20

| | STGCNN | | | | GP-Graph - STGCNN | | | | | SGCN | | | | GP-Graph - SGCN | | | | |
|---|---|---|---|---|---|---|---|---|---|---|---|---|---|---|---|---|---|---|
| | ADE↓ | FDE↓ | COL↓ | TCC↑ | ADE↓ | FDE↓ | COL↓ | TCC↑ | Gain↑ | ADE↓ | FDE↓ | COL↓ | TCC↑ | ADE↓ | FDE↓ | COL↓ | TCC↑ | Gain↑ |
| ETH | 0.73 | 1.21 | 1.80 | 0.47 | **0.48** | **0.77** | **1.15** | **0.63** | 36.4% | 0.63 | 1.03 | 1.69 | 0.55 | **0.43** | **0.63** | **1.35** | **0.65** | 38.8% |
| HOTEL | 0.41 | 0.68 | 3.94 | 0.28 | **0.24** | **0.40** | **2.00** | **0.32** | 41.2% | 0.32 | 0.55 | 2.52 | 0.29 | **0.18** | **0.30** | **0.66** | **0.35** | 45.5% |
| UNIV | 0.49 | 0.91 | 9.69 | 0.63 | **0.29** | **0.47** | **7.54** | **0.77** | 48.4% | 0.37 | 0.70 | 6.85 | 0.69 | **0.24** | **0.42** | **5.52** | **0.80** | 40.0% |
| ZARA1 | 0.33 | 0.52 | 2.54 | 0.71 | **0.24** | **0.40** | **2.13** | **0.82** | 23.1% | 0.29 | 0.53 | 0.79 | 0.74 | **0.17** | **0.31** | **0.62** | **0.86** | 41.5% |
| ZARA2 | 0.30 | 0.48 | 7.15 | 0.39 | **0.23** | **0.40** | **3.80** | **0.49** | 16.7% | 0.25 | 0.45 | 2.23 | 0.49 | **0.15** | **0.29** | **1.44** | **0.56** | 35.6% |
| AVG | 0.45 | 0.76 | 5.02 | 0.50 | **0.29** | **0.49** | **3.32** | **0.60** | 35.5% | 0.37 | 0.65 | 2.82 | 0.55 | **0.23** | **0.39** | **1.92** | **0.64** | 40.0% |
| SDD | 20.8 | 33.2 | 6.79 | 0.47 | **10.6** | **20.5** | **4.36** | **0.67** | 38.3% | 25.0 | 41.5 | 4.45 | 0.57 | **15.7** | **32.5** | **2.59** | **0.60** | 21.7% |
| GCS | 14.7 | 23.9 | 3.92 | 0.70 | **11.5** | **19.3** | **1.24** | **0.73** | 19.2% | 11.2 | 20.7 | 1.45 | 0.78 | **7.8** | **13.7** | **0.67** | **0.79** | 33.8% |

| | STAR | | | | GP-Graph - STAR | | | | | PECNet | | | | GP-Graph - PECNet | | | | |
|---|---|---|---|---|---|---|---|---|---|---|---|---|---|---|---|---|---|---|
| | ADE↓ | FDE↓ | COL↓ | TCC↑ | ADE↓ | FDE↓ | COL↓ | TCC↑ | Gain↑ | ADE↓ | FDE↓ | COL↓ | TCC↑ | ADE↓ | FDE↓ | COL↓ | TCC↑ | Gain↑ |
| ETH | **0.36** | 0.65 | 1.46 | 0.72 | **0.36** | **0.59** | **0.88** | **0.76** | 10.0% | 0.64 | 1.13 | 3.08 | 0.58 | **0.56** | **0.82** | **2.38** | **0.59** | 27.3% |
| HOTEL | **0.17** | **0.36** | 1.51 | **0.32** | 0.20 | 0.39 | **1.46** | 0.30 | -8.3% | 0.22 | 0.38 | 5.69 | 0.33 | **0.18** | **0.26** | **3.45** | **0.34** | 32.1% |
| UNIV | **0.31** | 0.62 | 1.95 | 0.69 | **0.31** | **0.57** | **1.65** | **0.73** | 7.4% | 0.35 | 0.57 | 3.80 | 0.75 | **0.31** | **0.46** | **2.89** | **0.77** | 19.5% |
| ZARA1 | **0.26** | 0.55 | 1.55 | 0.73 | **0.26** | **0.49** | **1.39** | **0.78** | 10.8% | 0.25 | 0.45 | 2.99 | 0.80 | **0.23** | **0.40** | **2.57** | **0.82** | 11.7% |
| ZARA2 | **0.22** | 0.46 | 1.46 | 0.50 | **0.22** | **0.39** | **1.27** | **0.54** | 14.4% | 0.18 | 0.31 | 4.91 | 0.55 | **0.17** | **0.27** | **2.92** | **0.58** | 13.0% |
| AVG | **0.26** | 0.53 | 1.59 | 0.59 | 0.27 | **0.49** | **1.33** | **0.62** | 7.8% | 0.33 | 0.60 | 4.09 | 0.61 | **0.29** | **0.44** | **2.84** | **0.62** | 26.4% |
| SDD | 14.9 | 28.2 | 0.72 | 0.59 | **13.7** | **25.2** | **0.35** | **0.61** | 10.4% | 10.0 | 15.8 | **0.22** | 0.64 | **9.1** | **13.8** | 0.23 | **0.65** | 12.7% |
| GCS | 15.6 | 31.8 | 1.79 | **0.80** | **14.9** | **30.3** | **0.81** | **0.80** | 4.8% | 17.1 | 29.3 | 0.20 | 0.71 | **14.2** | **23.9** | **0.19** | **0.72** | 18.4% |

Bold: Best, Underline: Second best

PEDESTRIAN TRAJECTORY PREDICTION METHOD

CROSS-REFERENCE TO RELATED APPLICATIONS

This application claims the priority of Korean Patent Application No. 10-2022-0032099 filed on Mar. 15, 2022 and No. 10-2022-0052202 filed on Apr. 27, 2022 in the Korean Intellectual Property Office, the disclosure of which is incorporated herein by reference.

BACKGROUND OF THE INVENTION

Field of the Invention

The present invention relates to a method for sampling a random vector corresponding to an intention of a pedestrian non-stochastically or applying a social statistical element that the majority of pedestrians move in groups to training, in training a neural network model for pedestrian trajectory prediction.

Description of the Related Art

Pedestrian trajectory prediction technology is a technology that estimates a future trajectory based on a past trajectory of a pedestrian, and can be applied to various areas such as behavioral prediction, crowd movement analysis, abnormal movement detection, and traffic flow analysis.

Various computer vision technologies have been used to predict the pedestrian trajectory, and deep learning technology has been applied to enhance predictive accuracy in recent years.

The most commonly used deep learning technology among the technologies is a stochastic trajectory prediction technology, and as illustrated in FIGS. 1A-1C, when approach methods including Gaussian Distribution (FIG. 1A), generative adversarial network (FIG. 1B), conditional variational autoencoder (FIG. 1C), etc., are used for the pedestrian trajectory prediction, a random vector corresponding to the prediction trajectory is stochastically sampled like rolling a dice, and a neural network model is trained by using the sampled random vector.

Since the technology is basically based on a probability, available random vectors are infinitely classified, and when the number of training execution times is indefinitely repeated, predictive accuracy continues to rise. However, the number of prediction trajectories to be sampled is not enough to indicate all trajectories that can actually occur, and it is also impossible to execute indefinite repeated execution in an application program, so there is a limit that it is very difficult to secure a predetermined level of prediction accuracy through the technology.

In other words, there is a problem in that the previously illustrated existing technologies are fundamentally sensitive to bias due to the fixed number of samples and stochastic sampling, accordingly predicting a completely different trajectory from an actual result as illustrated in FIG. 2.

In addition, the recent trajectory prediction studies with deep learning have focused on individual pedestrians, and it is expected that an interaction between respective pedestrians will be sufficiently reflected through graph-based network models such as graph convolutional network (GCN), graph attention network (GAT), graph transformer network (GTN), etc., but as the number of edges connecting respective pedestrians (nodes) increases, it is very difficult to train the neural network model, there is a limit that the trajectory prediction is very inaccurate in an environment which is crowded due to the pedestrians.

SUMMARY OF THE INVENTION

The present invention has been made in an effort to sample a random vector corresponding to an intention of a pedestrian stochastically and use the random vector for training a neural network model when training various neural network models used for pedestrian trajectory prediction.

Further, the present invention has been made in an effort to apply a social statistical element that the majority of pedestrians move in groups to training deep learning in pedestrian trajectory prediction using a neural network model.

The objects of the present disclosure are not limited to the above-mentioned objects, and other objects and advantages of the present disclosure that are not mentioned can be understood by the following description, and will be more clearly understood by exemplary embodiments of the present disclosure. Further, it will be readily appreciated that the objects and advantages of the present disclosure can be realized by means and combinations shown in the claims.

In order to solve the problem, according to an exemplary embodiment of the present invention includes: sampling, based on a pedestrian trajectory of a target pedestrian, a predetermined number of latent vectors among a plurality of random vectors corresponding to an intention of the target pedestrian non-stochastically; and extracting a pedestrian feature vector from the pedestrian trajectory, and applies the pedestrian feature vector and the latent vectors to a neural network model to determine the expected trajectory of the target pedestrian.

In an exemplary embodiment, the method further includes collecting a pedestrian image including the target pedestrian, and identifying the pedestrian trajectory of the target pedestrian in the pedestrian image.

In an exemplary embodiment, the identifying of the pedestrian trajectory of the target pedestrian includes detecting a location of the target pedestrian for each frame, and identifying the pedestrian trajectory.

In an exemplary embodiment, the sampling of the latent vectors non-stochastically includes sampling the predetermined number of latent vectors in the order in which trajectories predicted by the plurality of random vectors are most similar to an actual trajectory of the target pedestrian upon learning the neural network model.

In an exemplary embodiment, the sampling of the latent vectors non-stochastically includes sampling the predetermined number of latent vectors by applying a loss function which decreases as the trajectories predicted by the plurality of random vectors are more similar to the actual trajectory of the target pedestrian to the neural network model.

In an exemplary embodiment, the sampling of the latent vectors non-stochastically includes sampling the predetermined number of latent vectors in the order in which a distance between respective trajectories predicted by the plurality of random vectors are largest upon learning the neural network model.

In an exemplary embodiment, the sampling of the latent vectors non-stochastically includes sampling the predetermined number of latent vectors by applying a loss function which decreases as the distance between the respective trajectories predicted by the plurality of random vectors to the neural network model.

In an exemplary embodiment, the sampling of the latent vectors non-stochastically includes sampling the predetermined number of latent vectors so that the distance between respective trajectories predicted by the plurality of random vectors are largest while the trajectories predicted by the plurality of random vectors are most similar to the actual trajectory of the target pedestrian.

In an exemplary embodiment, sampling of the latent vectors non-stochastically includes applying, to the neural network model, a final loss function acquired by a linear combination of a first loss function decreases as the trajectories predicted by the plurality of random vectors are more similar to the actual trajectory of the target pedestrian and a second loss function decreases as the distance between the respective trajectories predicted by the plurality of random vectors is larger to sample the predetermined number of latent vectors.

In an exemplary embodiment, the sampling of the latent vectors non-stochastically includes extracting an interaction-aware feature between the target pedestrian and a surrounding pedestrian, and reflecting the interaction-aware feature to sample the latent vector.

In an exemplary embodiment, the extracting of the interaction-aware feature includes extracting the interaction-aware feature through a graph attention network (GAT), and inputting the interaction-aware feature into a multi-layer perception (MLP) to sample the latent vector.

In an exemplary embodiment, the neural network model is learned by using a training dataset constituted by the pedestrian trajectory of the target pedestrian for a first time interval of the pedestrian image and the pedestrian trajectory of the target pedestrian for a second time interval continued to the first time interval.

In an exemplary embodiment, the determining of the expected trajectory of the target pedestrian includes outputting the expected trajectory of the target pedestrian by applying the pedestrian feature vector and the latent vector to any one of Gaussian distribution, Generative Adversarial Network (GAN), and Conditional Variational AutoEncoder (CVAE).

Further, in order to solve the problem, according to an exemplary embodiment of the present invention, a method for predicting a pedestrian trajectory includes: classifying, based on pedestrian trajectories of a pedestrians, the plurality of pedestrians into at least one pedestrian group; generating each of first graph data according to a relationship of the pedestrian group, second graph data according to a relationship of the pedestrians in each pedestrian group, and third graph data according to a relationship of all of the plurality of pedestrians; and generating an expected trajectory for each of the plurality of pedestrians by inputting the first to third graph data into a neural network model.

In an exemplary embodiment, the method further includes collecting a pedestrian image including the plurality of pedestrians, and identifying the pedestrian trajectories of the plurality of the plurality of pedestrians in the pedestrian image.

In an exemplary embodiment, the identifying of the pedestrian trajectories of the plurality of pedestrians includes identifying the pedestrian trajectory by detecting a location of each pedestrian for each frame.

In an exemplary embodiment, the classifying of the plurality of pedestrians into at least one pedestrian group includes classifying, based on a distance between the pedestrian trajectories of the plurality of pedestrians, the plurality of pedestrians into at least one pedestrian group.

In an exemplary embodiment, the classifying of the plurality of pedestrians into at least one pedestrian group includes classifying the plurality of pedestrians into the same group when the distance between the pedestrian trajectories of the plurality of pedestrians is equal to or less than a reference value.

In an exemplary embodiment, the classifying of the plurality of pedestrians into at least one pedestrian group includes inputting the pedestrian trajectories of the plurality of pedestrians into a grouping neural network, and the grouping neural network extracts features from the pedestrian trajectories of the plurality of pedestrians through a convolutional layer, and classifies the plurality of pedestrians into the same pedestrian group when the distance between the extracted features is equal to or less than the reference value.

In an exemplary embodiment, the grouping neural network is learned through a gradient descent using a straight-through estimator (STE).

In an exemplary embodiment, the reference value is a learnable parameter of the grouping neural network.

In an exemplary embodiment, the generating of the first graph data includes pooling pedestrian trajectories of pedestrians which belong to each pedestrian group to determine a representative location of each pedestrian group, and generating the first graph data according to a node representing the representative location and an edge connecting the representative location for each pedestrian group.

In an exemplary embodiment, the generating of the second graph data includes generating the second graph data according to a node representing a time-wise location of the pedestrian in each pedestrian group and an edge connecting locations of the pedestrians in each pedestrian group.

In an exemplary embodiment, the generating of the third graph data includes generating the third graph data according to a node representing time-wise locations of the plurality of pedestrians and an edge connecting the locations of the plurality of pedestrians.

In an exemplary embodiment, the generating of the expected trajectory for each of the plurality of pedestrians includes inputting the first to third graph data into first to third graph based neural network sharing parameters, respectively, and integrating outputs of the first to third graph based neural networks to generating the expected trajectory for each of the plurality of pedestrians.

In an exemplary embodiment, the generating of the expected trajectory for each of the plurality of pedestrians includes unpooling the outputs of the neural network model for the first graph data so that expected trajectories of pedestrians which belong to the same pedestrian group are the same as each other.

In an exemplary embodiment, the generating of the expected trajectory for each of the plurality of pedestrians includes sampling latent vectors corresponding to intentions of the plurality of pedestrians, and inputting the latent vectors and the first to third graph data into the neural network model to generate the expected trajectory.

In an exemplary embodiment, in the sampling of the latent vectors, the same latent vector is sampled with respect to the pedestrians which belong to the same pedestrian group.

According to an exemplary embodiment of the present invention, when various neural network models used for pedestrian trajectory prediction are trained, a random vector corresponding to an intention of a pedestrian is sampled statistically to enhance prediction accuracy of a neural network model, and derive various expected trajectories which can be implemented by the neural network model to be output.

Further, according to the present invention, an interaction between pedestrian groups is structuralized with data to allow a neural network model for trajectory prediction to learn an intrinsic complexity of a social interaction.

Further, according to the present invention, there is an advantage in that as each pedestrian group is set to a node of graph data, the number of nodes can be reduced, so a data biasing problem of the neural network model can be prevented, and it is possible to flexibly cope with a change in number of pedestrians upon the trajectory prediction.

Further according to the present invention, in one pedestrian image, each of an interaction between the pedestrian groups, an interaction between the pedestrians in the pedestrian group, and an interaction among all pedestrians is structuralized with the graph data to augment data at the time of learning the neural network model.

In addition to the above-described effects, the specific effects of the present invention will be described below together while describing the specific matters for the present invention.

BRIEF DESCRIPTION OF THE DRAWINGS

FIG. 6 is a diagram for describing a difference between the stochastic sampling and non-stochastic sampling.

FIG. 11 is a diagram illustrating a capability comparison table between a case of applying the present invention and a case of not applying the present invention.

FIG. 20 is a diagram illustrating a capability comparison table according to whether to apply the present invention.

DETAILED DESCRIPTION OF THE PREFERRED EMBODIMENT

Figure 1A:
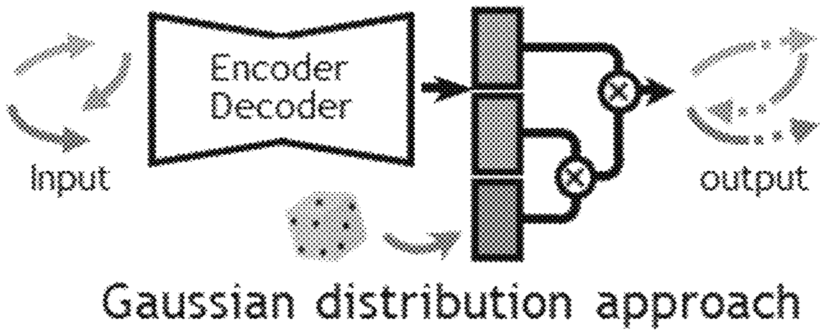
FIGS. 1A-1C are diagrams illustrating pedestrian trajectory prediction models through stochastic sampling in the related art.

The above-mentioned objects, features, and advantages will be described below in detail with reference to the accompanying drawings. Therefore, those skilled in the art to which the present invention pertains may easily practice a technical idea of the present invention. In describing the present invention, a detailed description of related known technologies will be omitted if it is determined that they unnecessarily make the gist of the present invention unclear. Hereinafter, a preferable embodiment of the present invention will be described in detail with reference to the accompanying drawings. In the drawings, the same reference numeral is used to indicate the same or similar component.

In this specification, although the terms "first", "second", and the like are used for describing various components, these components are not confined by these terms. These terms are only used to distinguish one component from other components, and unless there is particularly disclosed contrary thereto, a first component may be a second component, of course.

Further, in this specification, any component being disposed "at an upper portion (or lower portion)" of a component or "above (or below)" a component may mean that any component is disposed in contact with an upper surface (or a lower surface) of the component and another component is interposed between the component and any component disposed above (or below) the component.

Further, in this specification, when it is disclosed that any component is "connected", "coupled", or "linked" to other components, it should be understood that the components may be directly connected or linked to each other, but another component may be "interposed" between the respective components or the respective components may be "connected", "coupled", or "linked" through another component.

Further, a singular form used in the present disclosure may include a plural form if there is no clearly opposite meaning in the context. In this application, a term such as "comprising" or "including" should not be interpreted as necessarily including all various components or various steps disclosed in the present disclosure, and it should be interpreted that some component or some steps among them may not be included or additional components or steps may be further included.

In addition, in this specification, when the component is called "A and/or B", this means that the component means A, B or A and B unless it is not particularly disclosed contrary thereto, and when the component is called "C to D", this means that the component is C or more and D or less unless it is not particularly disclosed contrary thereto.

The present invention relates to a method for sampling a random vector corresponding to an intention of a pedestrian non-stochastically in training a neural network model for pedestrian trajectory prediction. Hereinafter, a pedestrian trajectory prediction method through non-stochastic sampling according to an exemplary embodiment of the present invention will be described in detail with reference to FIGS. 3 to 11.

Figure 3:
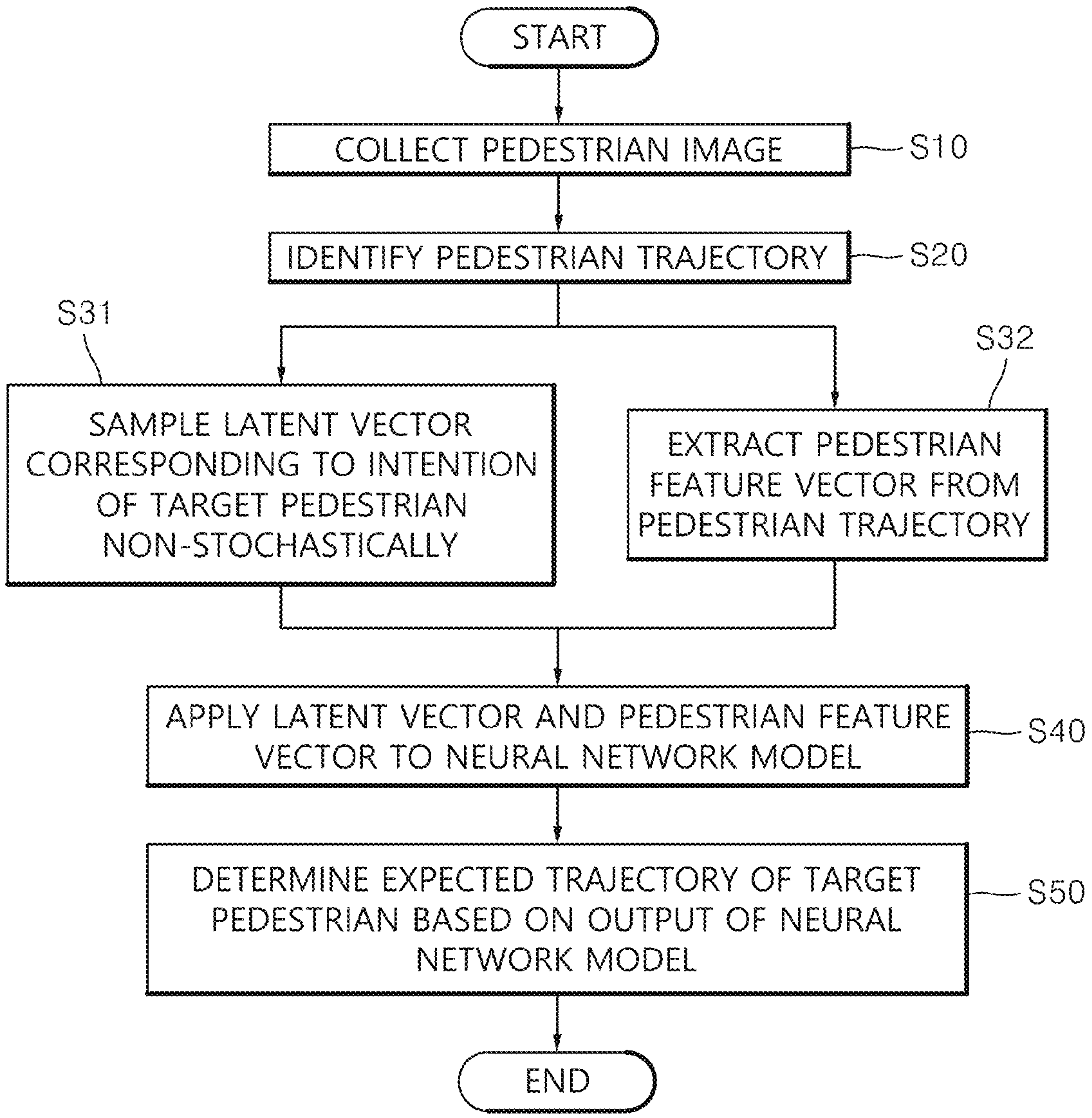
FIG. 3 is a flowchart illustrating a pedestrian trajectory prediction method through non-stochastic sampling according to an exemplary embodiment of the present invention.

FIG. 3 is a flowchart illustrating a pedestrian trajectory prediction method through non-stochastic sampling according to an exemplary embodiment of the present invention.

Figure 4:
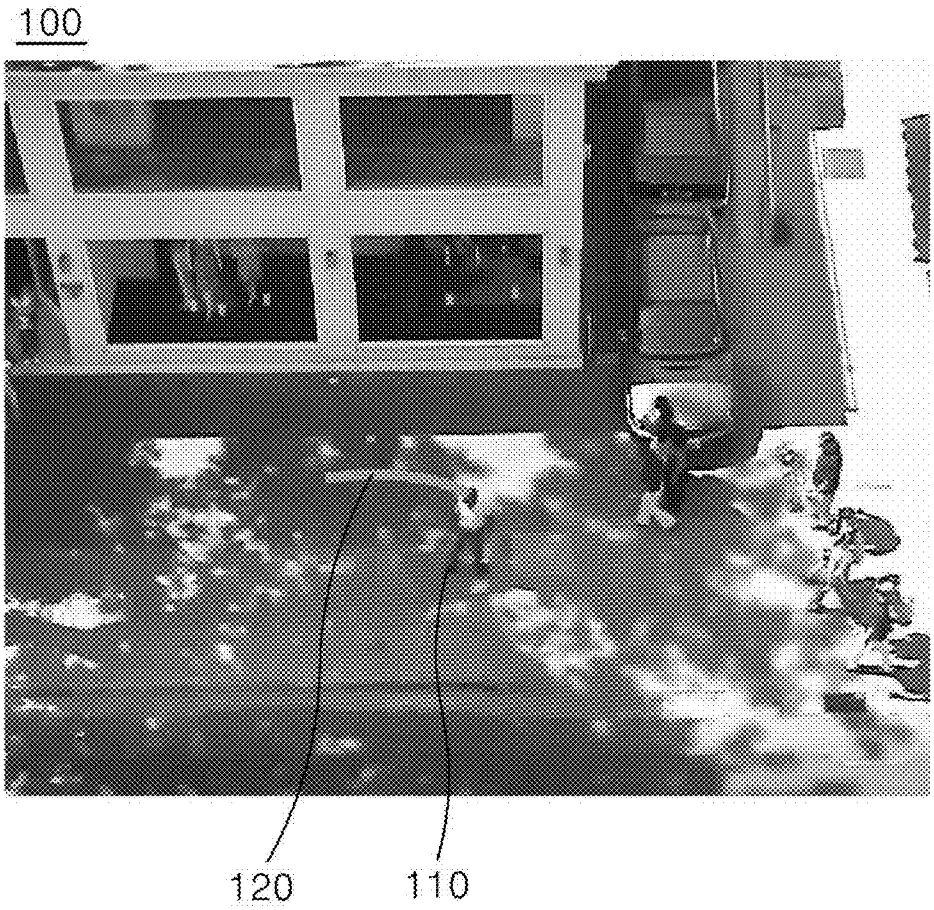
FIG. 4 is a diagram illustrating a pedestrian trajectory of a target pedestrian.
Figure 5:
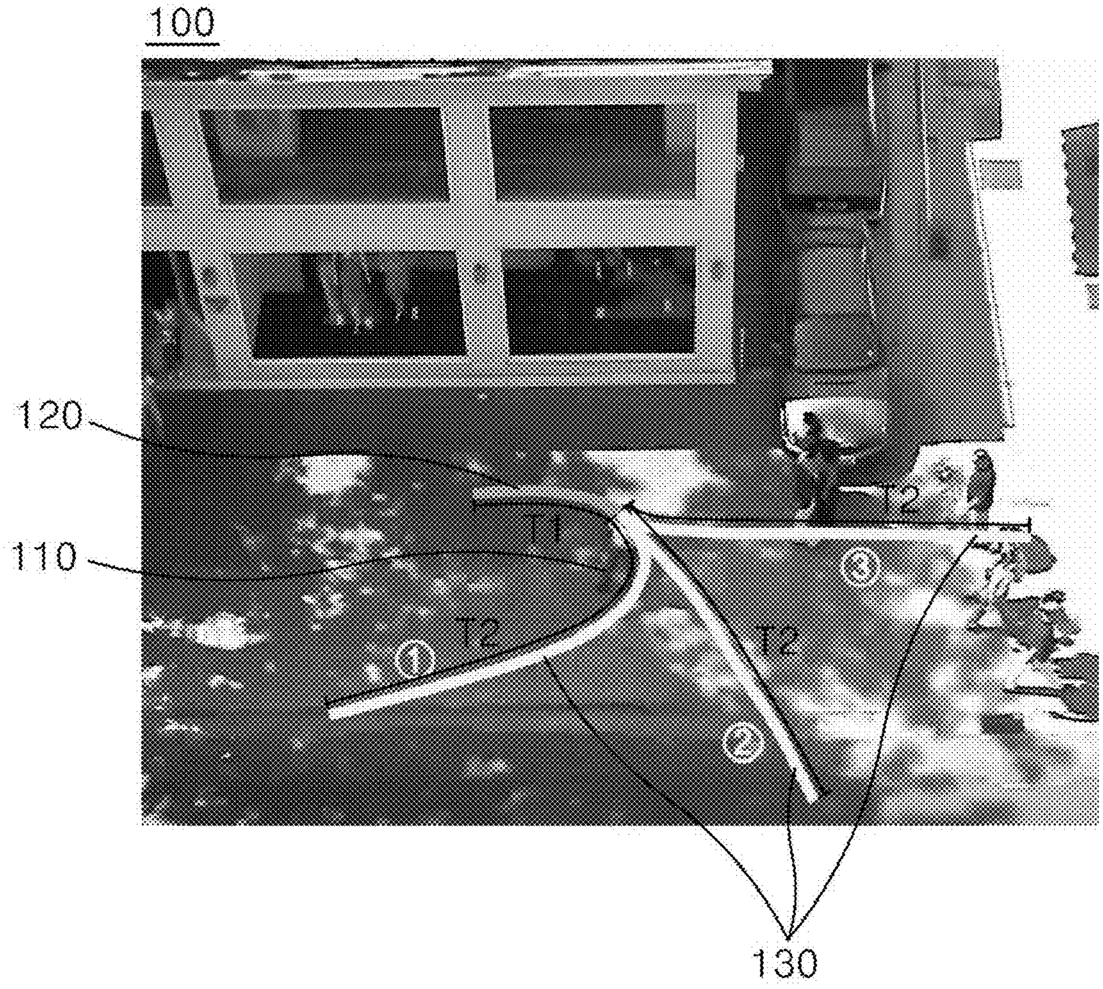
FIG. 5 is a diagram illustrating an expected trajectory of the target pedestrian illustrated in FIG. 4.

FIG. 4 is a diagram illustrating a pedestrian trajectory of a target pedestrian and FIG. 5 is a diagram illustrating an expected trajectory of the target pedestrian illustrated in FIG. 4.

Figure 7:
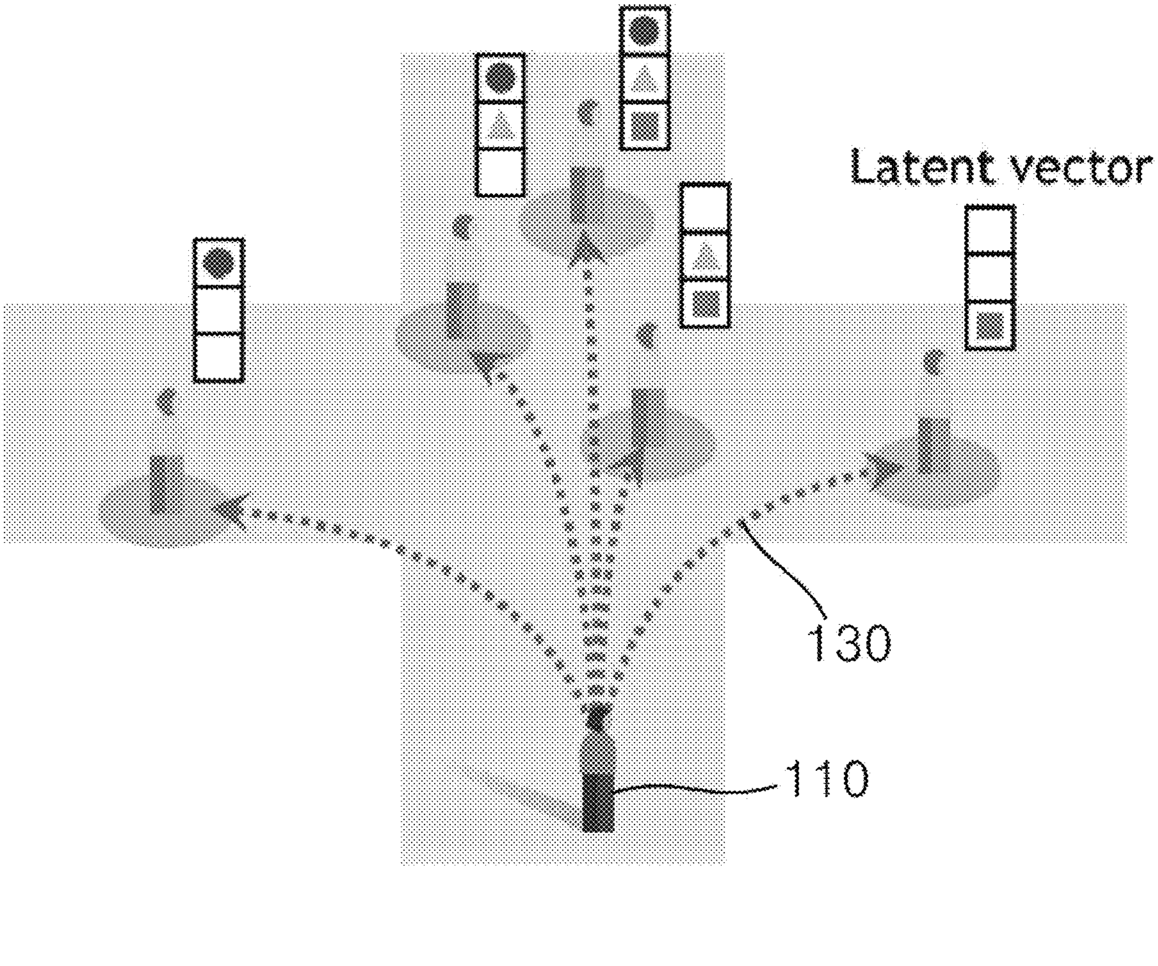
FIG. 7 is a diagram illustrating a latent vector for each expected trajectory sampled non-stochastically.

FIG. 6 is a diagram for describing a difference between the stochastic sampling and non-stochastic sampling and FIG. 7 is a diagram illustrating a latent vector for each expected trajectory sampled non-stochastically.

Figure 8:
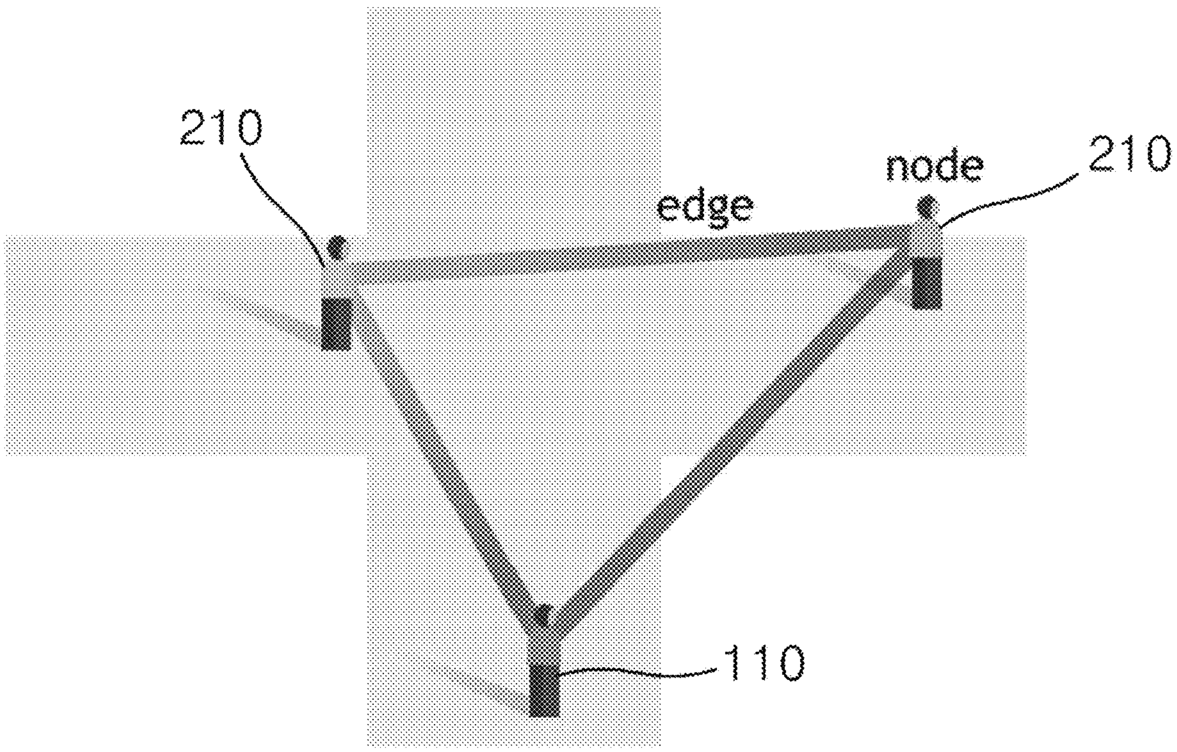
FIG. 8 is a diagram illustrating a relationship between pedestrians for application of graph attention network (GAT).

FIG. 8 is a diagram illustrating a relationship between pedestrians for application of graph attention network (GAT).

Figure 9:
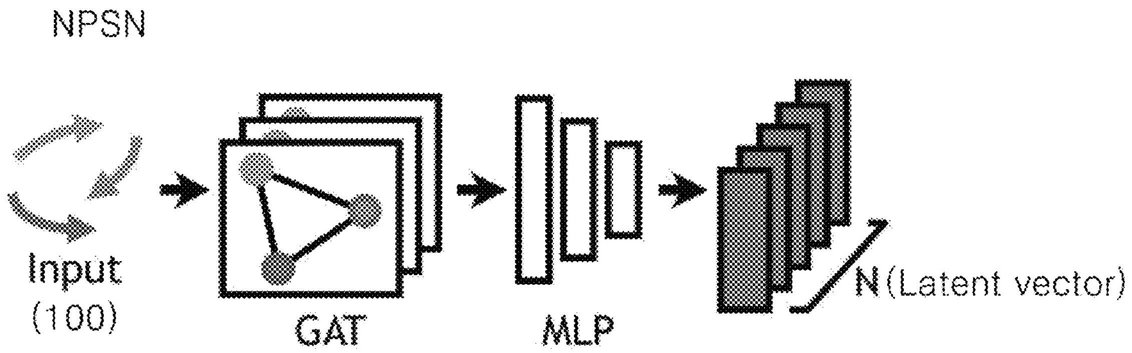
FIG. 9 is a diagram illustrating an exemplary embodiment of neural network architecture for describing the latent vector.

FIG. 9 is a diagram illustrating an exemplary embodiment of neural network architecture for describing the latent vector and FIG. 11 is a diagram illustrating a capability comparison table between a case of applying the present invention and a case of not applying the present invention.

FIG. 11 is a diagram illustrating a capability comparison table between a case of applying the present invention and a case of not applying the present invention.

Referring to FIG. 3, the pedestrian trajectory prediction method according to an exemplary embodiment of the present invention may include a step (S10) of collecting a pedestrian image, a step (S20) of identifying a pedestrian trajectory of a target pedestrian, a step (S31) of sampling a latent vector corresponding to an intention of the target pedestrian non-stochastically, a step (S32) of extracting a pedestrian feature vector from the pedestrian trajectory, a step (S40) of applying the latent vector and the pedestrian feature vector to a neural network model, and a step (S50) of determining an expected trajectory of the target pedestrian based on an output of the neural network model.

However, the pedestrian trajectory prediction method illustrated in FIG. 3 follows an exemplary embodiment, and respective steps that constitute the present invention are not limited to the exemplary embodiment, and as necessary, some steps may be added, modified, or deleted.

The respective steps illustrated in FIG. 3 may be performed by the processor, and the processor may include at least physical element of application specific integrated circuits (Asics), digital signal processors (DSPs), digital signal processing devices (DSPDs), programmable logic devices (PLDs), field programmable gate arrays (FPGAS), controllers, and micro-controllers.

Hereinafter, the respective steps illustrated in FIG. 3 will be described in detail.

The processor may collect a pedestrian image 100 including a target pedestrian 110 (S10).

The target pedestrian 110 may mean a pedestrian which becomes a target of trajectory prediction, and the pedestrian image 100 may be a predetermined image containing a figure in which the target pedestrian 110 moves. The pedestrian image 100 may be an image of various views, and specifically, may be an image of a first person view (FPV) in which the target pedestrian 110 is shot or an image of a surveillance view.

The processor may collect the pedestrian image 100 from the other device or a predetermined storage medium. For example, the processor may collect the pedestrian image 100 in front of a vehicle from the vehicle, and collect the pedestrian image 100 in a surveillance area from a CCTV, and collect the pedestrian image 100 from a predetermined database.

Subsequently, the processor may identify a pedestrian trajectory 120 of the target pedestrian 10 in the pedestrian image 100 (S20).

Referring to FIG. 4 illustrating one example of the pedestrian image 100, the pedestrian trajectory 120 may mean a trajectory in which the target pedestrian 110 moves in the pedestrian image 100, and may be identified in continuous frames. The processor may detect a location of the target pedestrian 110 for each frame of the pedestrian image 100, and identify the pedestrian trajectory 120 based on a location which is changed in time series. To this end, the processor may use a predetermined object detection algorithm known in the technical field. Specifically, the processor may detect a specific body portion of the target pedestrian 110, e.g., a location of a head for each frame, and connects the locations detected for each frame to identify the pedestrian trajectory 120.

Referring to FIG. 5, in the present invention, the expected trajectory 130 of the target pedestrian 100 may be then determined based on the pedestrian trajectory 120 identified as described above. Specifically, in the present invention, based on the pedestrian trajectory 120 for a first time interval T1, the expected trajectory 130 of a second time interval T2 continued to the first time interval T1 may be determined.

Here, an actual trajectory of the pedestrian in the second time interval T2 may be informally determined according to a latent intention of the pedestrian. As a result, in the trajectory prediction model in the related art, a method for randomly sampling random vectors corresponding to the latent intention of the pedestrian as large as the number of trajectories to be predicted, and using the sampled latent vectors for learning the neural network model to determine various expected trajectories 130 is used.

However, referring to FIG. 6, biasing due to stochastic sampling occurs in the conventional method, and in the present invention, the random vectors are sampled non-stochastically in order to remove the biasing to determine an implement able expected trajectory 130 by considering purpose in addition to the intention of the pedestrian.

Specifically, the processor may sample a predetermined number of latent vectors among a plurality of random vectors corresponding to the intention of the target pedestrian 110 non-stochastically based on the pedestrian trajectory 120 of the target pedestrian 110 (S31). Here, the random vector as a vector defined by a random number may be determined according to a Monte Carlo or a Quasi-Monte Carlo method. Further, since each latent vector corresponds to a latent intention, i.e., the expected trajectory 130, the predetermined number may be set to the number of expected trajectories 130 to be determined through the neural network model. Hereinafter, a non-stochastic sampling method of the present invention will be described.

In a first exemplary embodiment, upon learning the neural network model to be described below, the processor may sample a predetermined number of latent vectors in the order in which trajectories predicted by a plurality of random vectors are most similar to an actual trajectory of the target pedestrian 110. That is, among the random vectors, the predetermined number may be sampled according to the order in which the trajectory predicted by each random vector and the actual trajectory are most similar, and determined as the latent vector.

In the present invention, the neural network model may be learned by a training dataset constituted by the pedestrian trajectory 120 of the target pedestrian 110 for the first time interval T1 of the pedestrian image 100 and the pedestrian trajectory of the target pedestrian 110 for the second time interval T2 continued to the first time interval T1.

In other words, the neural network model may be learned to output the pedestrian trajectory 120 for the second time interval T2 when the pedestrian trajectory 120 for the first time interval T1 is input. In this case, the pedestrian trajectory 120 for the second time interval T2 used for learning may be the actual trajectory (ground truth (GT)) of the target pedestrian 110.

In end-to-end learning, the processor may train parameters (e.g., a weight and a bias) of each layer and node constituting the neural network model so that the trajectory predicted by the random vector is similar to the actual trajectory.

To this end, the processor may apply, to the neural network model, a loss function which becomes smaller as the trajectories predicted by the plurality of random vectors are more similar to the actual trajectory of the target pedestrian 110.

The neural network model may learn the parameters in the model so that a value of the loss function becomes minimal by using a gradient descent, and a latent vector which minimizes the loss function among the random vectors may be sampled.

Specifically, the processor applies a loss function $L_{dist}$ of [Equation 1] below to the neural network model to sample the random vector to allow the neural network model to sample the random vector so that a Euclidian distance (L2 distance) between the trajectory predicted by the random vector and the actual trajectory decreases.

$$\mathcal{L}_{dist} = \frac{1}{L}\sum_{l=1}^{L}\min_{n\in[1,\ldots,N]}\left\|\hat{Y}_{l,n}^{1:T_{pred}} - Y_{l}^{1:T_{pred}}\right\|$$

(L represents the number of target pedestrians 110, N represents the random vector, $$\hat{Y}_{l,n}^{1:T_{pred}}$$

represents the trajectory predicted by the random vector, and $$Y_{l}^{1:T_{pred}}$$

represents the actual trajectory)

Meanwhile, when the latent vector is sampled according to the first exemplary embodiment, the prediction accuracy of the neural network mode for the actual trajectory may be enhanced, but as the learning of the neural network model is conducted, a problem in that the neural network model is excessively biased for the actual trajectory may occur.

That is, the neural network mode for predicting the pedestrian trajectory should predict the latent intention of the pedestrian and present various trajectories which may be generated, and when a sampling method of the first exemplary embodiment is used, the diversity of the trajectory predicted by the neural network model may be lowered.

As a result, the processor may also conduct sampling by the following method.

In a second exemplary embodiment, upon learning the neural network model, the processor may sample a predetermined number of latent vectors in the order in which a distance between respective trajectories expected by the plurality of random vectors are largest. That is, among the random vectors, the predetermined number may be sampled according to the order in which the distance between the trajectories predicted by the respective random vectors is largest, and determined as the latent vector.

In other words, when the end-to-end learning is applied to the neural network model, the processor may allow the parameters of each layer and node constituting the neural network model to be learned so that the respective trajectories predicted by the random vectors are far from each other. That is, in the first exemplary embodiment, if the random vector is sampled according to the distance between the trajectory predicted by the random vector and the actual trajectory, the random vector may be sampled according to the distance between the respective trajectories predicted by the random vector in the second exemplary embodiment.

To this end, the processor may apply the loss function which becomes smaller as the distance between the respective trajectories predicted by the plurality of random vectors increases.

Similarly as in the first exemplary embodiment, the neural network model may learn the parameters in the model so that the value of the loss function becomes minimal by using the gradient descent, and the latent vector which minimizes the loss function among the random vectors may be sampled.

Specifically, the processor applies a loss function $D_{disc}$ of [Equation 2] below to the neural network model to sample the random vector to allow the neural network model to sample the random vector so that a Euclidian distance (L2 distance) between the respective trajectories predicted by the random vector increases.

$$\mathcal{L}_{disc} = \frac{1}{LN}\sum_{l=1}^{L}\sum_{i=1}^{N} -\log \min_{\substack{j\in[1,\ldots,N]\\ j\neq i}}\|S_{l,i} - S_{l,j}\| \qquad \text{[Equation 2]}$$

(L represents the number of target pedestrians 110, N represents the random vector, and $S_{1,i}$ and $S_{1,j}$ represent the trajectories predicted by the respective random vectors)

Meanwhile, when the latent vector is sampled according to the second exemplary embodiment, the neural network model may present various expected trajectories 130, but there is a problem in that the prediction accuracy for the actual trajectory may be lowered as the learning of the neural network model is conducted.

That is, since a general pedestrian walks in a shortest trajectory toward a destination, there is a high probability that an existing walking direction will be maintained as it is in most situations. In other words, the expected trajectory of the target pedestrian is more likely to extend a pre-identified pedestrian trajectory.

When this is considered, the neural network model should secure prediction accuracy of a predetermined level or more while providing various expected trajectories 130, and in the case of the second exemplary embodiment, since the random vector is sampled through a distance comparison between the expected trajectories 130 other than a distance comparison between the expected trajectory 130 and the actual trajectory, the prediction accuracy for the actual trajectory may be lowered as the learning is conducted.

As a result, the processor may sample the random vector by combining the first and second exemplary embodiments.

In a third exemplary embodiment, upon learning the neural network model, the processor may sample a predetermined number of latent vectors in the order in which the trajectories expected by the plurality of random vectors are most similar to the actual trajectory of the target pedestrian 110 and the distance between the respective trajectories predicted by the random vectors are largest.

That is, among the random vectors, the predetermined number may be sampled according to the order in which the trajectory predicted by each random vector and the actual trajectory are most similar and in the order in which the distance between the respective trajectories predicted by the random vectors are largest, and determined as the latent vector. In this case, whether a weight is to be assigned to a similarity between the expected trajectory 130 and the actual trajectory or whether the weight is to be assigned to a distance difference between the expected trajectories 130 may be determined according to setting of a user.

To this end, the processor may apply, to the neural network model, a final loss function acquired by a linear combination of a first loss function decreases as the trajectories predicted by the plurality of random vectors are more similar to the actual trajectory of the target pedestrian 110 and a second loss function decreases as the distance between the respective trajectories predicted by the plurality of random vectors is larger.

Similarly as in the first and second exemplary embodiments, the neural network model may learn the parameters in the model so that the value of the final loss function becomes minimal by using the gradient descent, and the latent vector which minimizes the final loss function among the random vectors may be sampled.

Specifically, the processor may apply a final loss function L of [Equation 3] below to the neural network model. $L_{dist}$ and $L_{disc}$ included in [Equation 3] may be the same as those disclosed in [Equation 1] and [Equation 2], respectively, and a scale difference between $L_{dist}$ and $L_{disc}$, and a relative weight may be controlled by λ.

$$\mathcal{L} = \mathcal{L}_{dist\ dist} + \lambda \mathcal{L}_{disc} \quad \text{[Equation 3]}$$

Referring to FIG. 7, when five latent vectors are sampled according to the third exemplary embodiment, a latent vector ○ corresponding to a left-direction expected trajectory 130, a latent vector ○Δ□ corresponding to a front-left expected trajectory 130, a latent vector ○Δ□ corresponding to a front expected trajectory 130, a latent vector Δ□ corresponding to a front-right expected trajectory 130, and a latent vector □ corresponding to a right-direction expected trajectory 130 may be sampled non-stochastically.

Meanwhile, the expected trajectory 130 of the pedestrian may be influenced by a movement of a surrounding pedestrian 210 located nearby. For example, the pedestrian may bypass to avoid the other pedestrian which comes from the front, and may find a specific pedestrian nearby and approach the specific pedestrian, and join a nearby pedestrian group to change a movement trajectory.

In order to consider mutual effects between the pedestrians, the processor may reflect an interaction-area feature of the target pedestrian 110 to the above-described latent vector sampling operation. To this end, the processor may use a graph based deep learning network, and for example, use Graph Convolutional Network (GCN), GraphSAGE, Graph Attention Network (GAT), etc. However, as described above, since it is normal that the pedestrian is more largely influenced by the surrounding pedestrian 210 located nearby, it may be preferable to use the GAT which the weight may be set differently for each neighboring node.

Referring to FIG. 8, the processor sets a location of each of the pedestrians in the pedestrian image 100, and defines an edge connecting each node to extract the interaction-aware feature for each node. Specifically, the processor may compute an importance $$a^k\left(W\vec{h}_i, W\vec{h}_j\right)$$

which an adjacent node j has with respect to a specific node i as an attention coefficient, and normalized to calculate an attention score $$\vec{e}^{\,k}_{i,j}.$$

$$\vec{e}^{\,k}_{i,j} = \frac{\exp\left(\sigma\left(a^k\left(W\vec{h}_i, W\vec{h}_j\right)\right)\right)}{\sum_{l=1}^{L}\exp\left(\sigma\left(a^k\left(W\vec{h}_i, W\vec{h}_l\right)\right)\right)} \quad \text{[Equation 4]}$$

(Here, both $a^k$ and W represent learnable parameters)

Subsequently, the processor may update an interaction-aware feature $$\vec{h}'_i$$

for each node, i.e., for each pedestrian according to [Equation 5] based on an attention score $$\vec{e}^{\,k}_{i,j}.$$

$$\vec{h}'_i = \frac{1}{K}\sum_{k=1}^{K}\sum_{l=1}^{L}\vec{e}^{\,k}_{i,j} W^k \vec{h}_j \quad \text{[Equation 5]}$$

The processor may sample the latent vector by inputting the interaction-aware feature determined according to the above-described method into multi-layer perceptron (MLP). In other words, the processor may train the MLP to express a non-linear relationship between the interaction-aware feature and the latent vector.

When specifically described with reference to FIG. 9, the processor inputs the pedestrian trajectory 120 into the GAT to extract the interaction-aware feature of the target pedestrian 110 based on the pedestrian trajectory 120. Subsequently, the processor may input the extracted interaction-aware feature into the MLP and the MLP may output the above-described latent vector. Architecture (hereinafter, referred to as non-probability sampling network (NPSN)) illustrated in FIG. 9 may constitute a part of the neural network model described above, and as a result, the NPSN is learned according to the above-described loss function to output the latent vector.

When the learning of the neural network model is completed as described above, the processor extracts a pedestrian feature vector from the pedestrian trajectory 120 of the target pedestrian 110 (S320), and applies the extracted pedestrian feature vector and the above sampled latent vector to the neural network model (S40) to determine the expected trajectory 130 of the target pedestrian 110 (S50).

In this case, a method for extracting the pedestrian feature vector (S32) and a method for applying the extracted pedestrian feature vector to the neural network model (S40) may be the same as the method used in the conventional pedestrian trajectory prediction model. That is, in the present invention, the random vector applied by the stochastic sampling method such as rolling a dice in the conventional neural network model descried in FIG. 1 is replaced with the non-stochastically sampled latent vector to determine the expected trajectory 130 of the target pedestrian 110.

As a result, the present invention may be applied to all Gaussian distribution, Generative Adversarial Network (GAN), and Conditional Variational AutoEncoder (CVAE) models.

Figure 10:
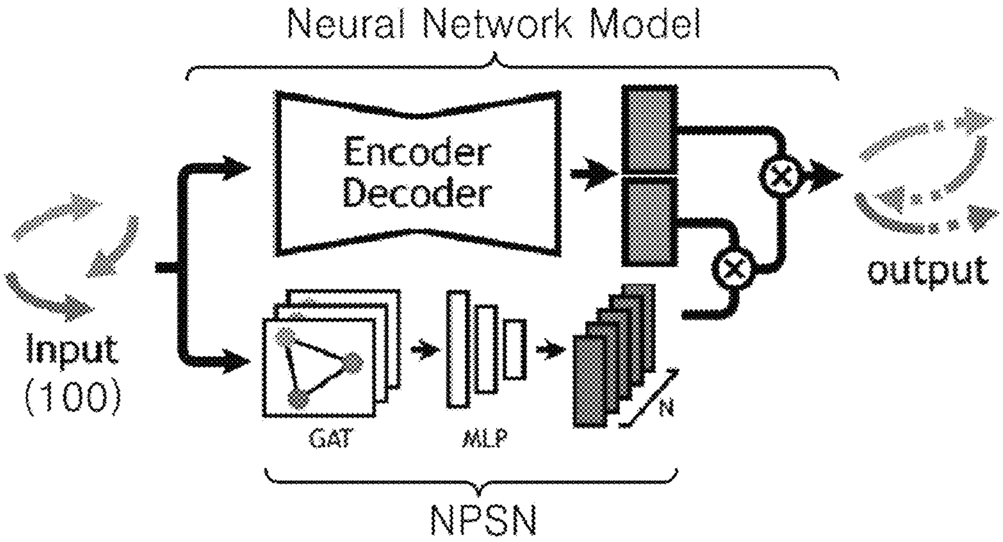
FIG. 10 is a diagram illustrating a pedestrian trajectory prediction model according to an exemplary embodiment of the present invention.

FIG. 10 is a diagram illustrating a state in which the present invention is applied to Gaussian distribution, Generative Adversarial Network (GAN). Referring to FIG. 10, the processor may input the pedestrian image 100 of the target pedestrian 110 into the neural network model. An encoder/decoder constituting the neural network model may identify the pedestrian trajectory 120 from the pedestrian image 100 through an encoding and/decoding operation, and may extract a pedestrian feature vector from the pedestrian trajectory 120. Simultaneously, the NPSN constituting the neural network model may sample a predetermined number (N) of latent vectors.

The extracted and sampled pedestrian feature vector and latent vector may be aggregated, and consequently, the neural network model may output N expected trajectories (classes) 130 and a generation probability of each expected trajectory 130 (a probability for each class).

The processor may determine at least one of N expected trajectories 130 output from the neural network model as the expected trajectory 130 of the target pedestrian 110. For example, the processor may also determine all of N expected trajectories 130 as the expected trajectory 130 of the target pedestrian 110, and may determine only one trajectory having a highest probability among N expected trajectories 130 as the expected trajectory 130 of the target pedestrian 110.

Figure 1B:
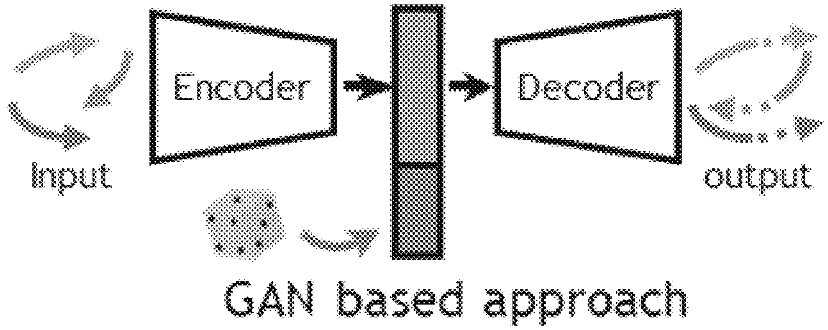
Figure 1C:
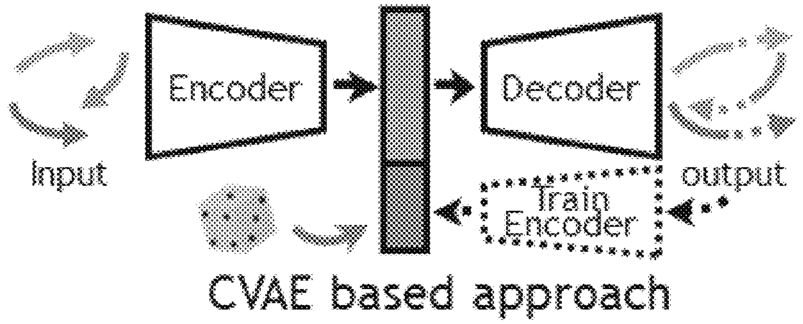
Figure 2:
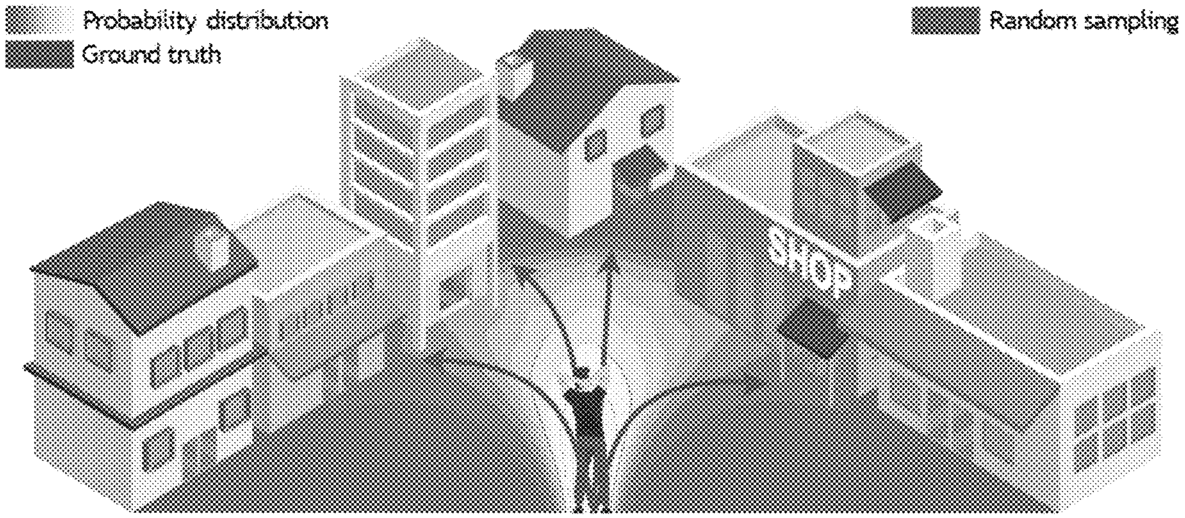
FIG. 2 is a diagram for describing a bias which occurs due to stochastic sampling in the prediction models of FIGS. 1A-1C.

In FIG. 10, a state in which the NPSN architecture illustrated in FIG. 9 is applied to the Gaussian distribution models illustrated in FIGS. 1A-1C, as described above, the NPSN architecture may be applied to all neural network models using the random vector for predicting the pedestrian trajectory, e.g., the GAN and CAVE based models, of course.

In FIG. 11, when the NPSN is applied to various neural network models in the related art for predicting the pedestrian trajectory, a capability (ADE/FDE) for datasets (ETH, HOTEL, UNIV, ZARA1, ZARA2) generally used for benchmark is illustrated, as illustrated in FIG. 11, when the NPSN architecture is combined with even any neural network model, it may be confirmed that the capability becomes very high.

As described above, according to an exemplary embodiment of the present invention, when various neural network models used for pedestrian trajectory prediction are trained, a random vector corresponding to an intention of a pedestrian is sampled statistically to enhance prediction accuracy of a neural network model, and derive various expected trajectories 130 which can be implemented by the neural network model to be output.

Further, the present invention relates to a method for predicting the trajectory of the pedestrian by applying a social statistical element that the majority of pedestrians move in groups to learning. Hereinafter, a trajectory prediction method (hereinafter, referred to as a pedestrian trajectory prediction method) through pedestrian grouping according to an exemplary embodiment of the present invention will be described in detail with reference to FIGS. 12 to 22.

Figure 12:
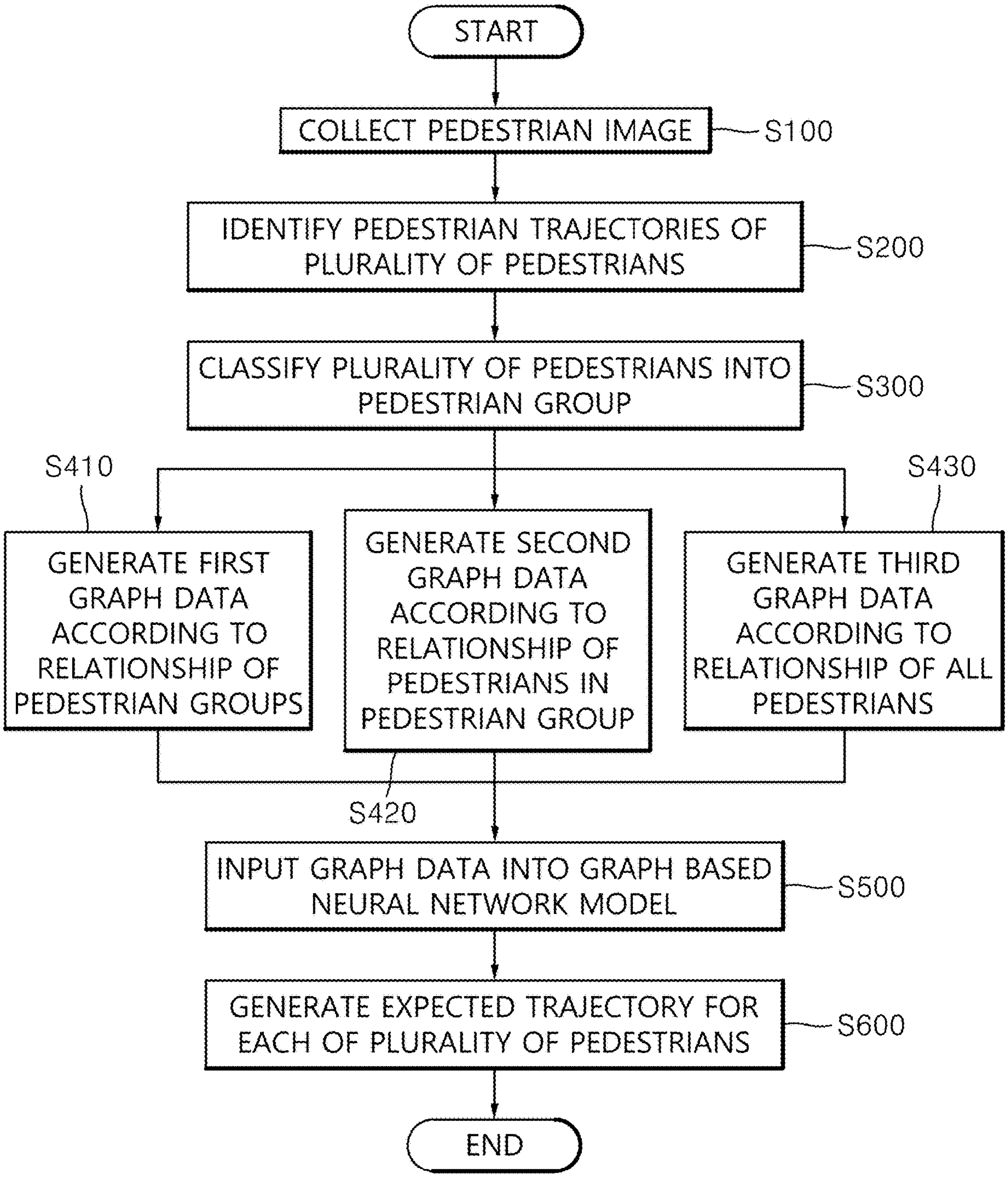
FIG. 12 is a flowchart illustrating a trajectory prediction method through pedestrian grouping according to an exemplary embodiment of the present invention.

FIG. 12 is a flowchart illustrating a trajectory prediction method through pedestrian grouping according to an exemplary embodiment of the present invention.

Figure 13:
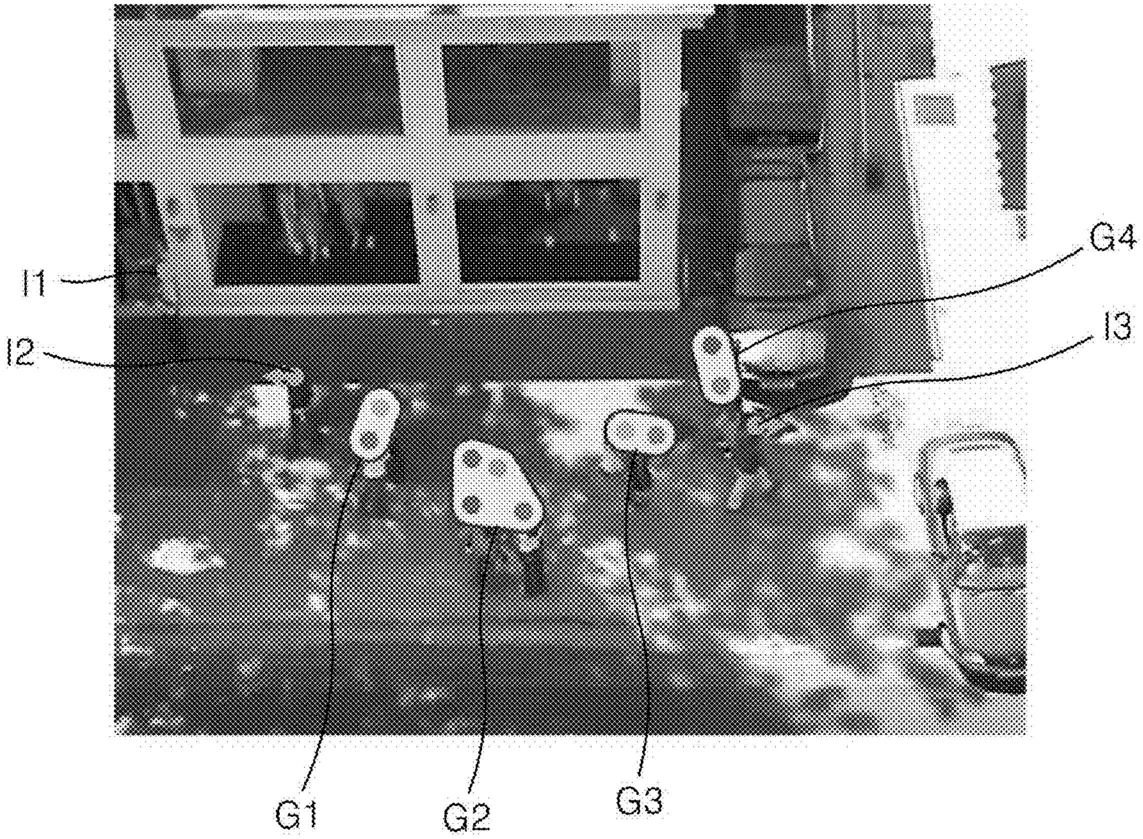
FIG. 13 is a diagram illustrating pedestrians which move individually or in groups.

FIG. 13 is a diagram illustrating pedestrians which move individually or in groups.

Figure 14:
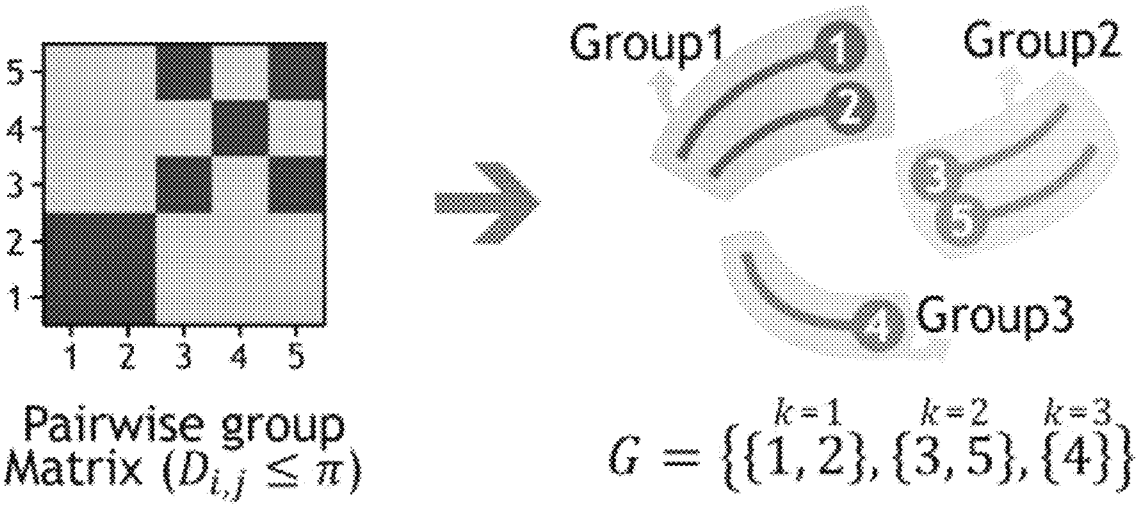
FIG. 14 is a diagram for describing a method for classifying a plurality of pedestrians into a pedestrian group.

FIG. 14 is a diagram for describing a method for classifying a plurality of pedestrians into a pedestrian group.

Figure 15:
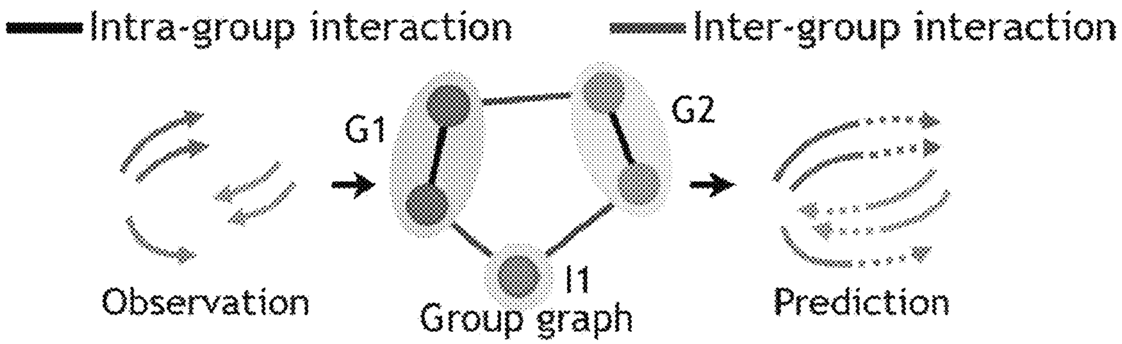
FIG. 15 is a diagram for describing a trajectory prediction operation through pedestrian grouping.

FIG. 15 is a diagram for describing a trajectory prediction operation through pedestrian grouping.

Figure 16:
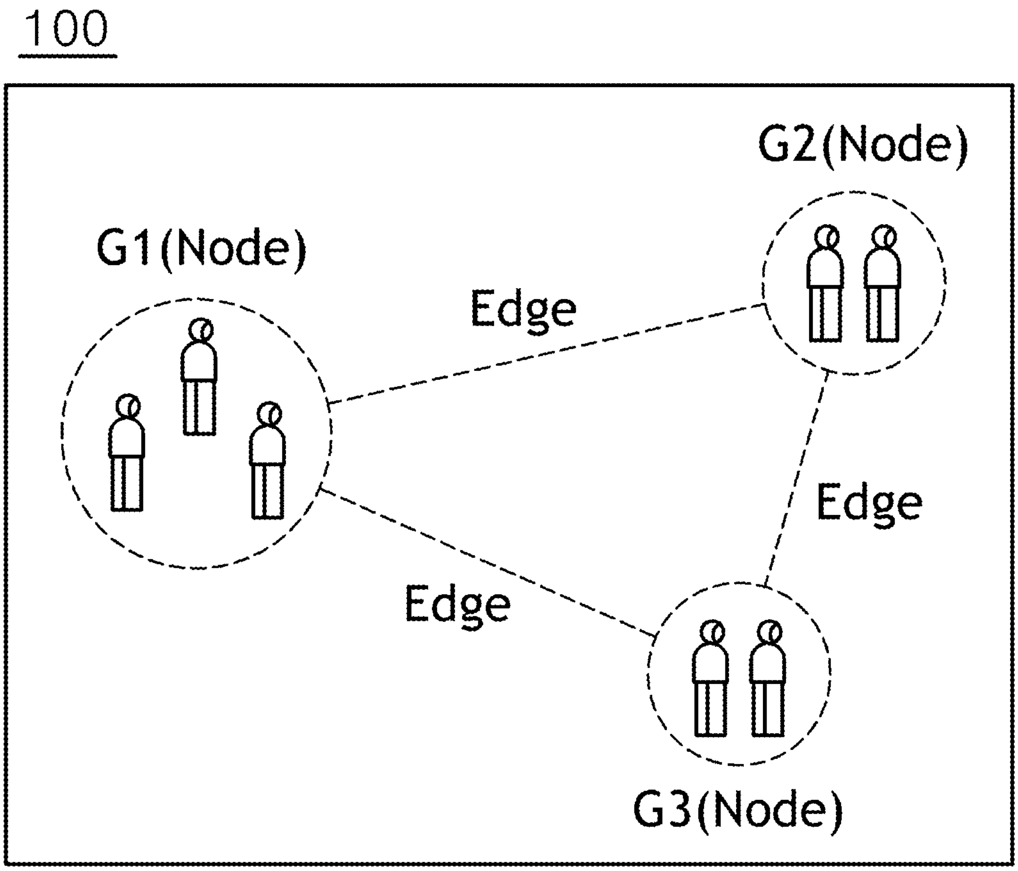
FIGS. 16 to 18 are diagrams for describing first to third graph data, respectively.
Figure 17:
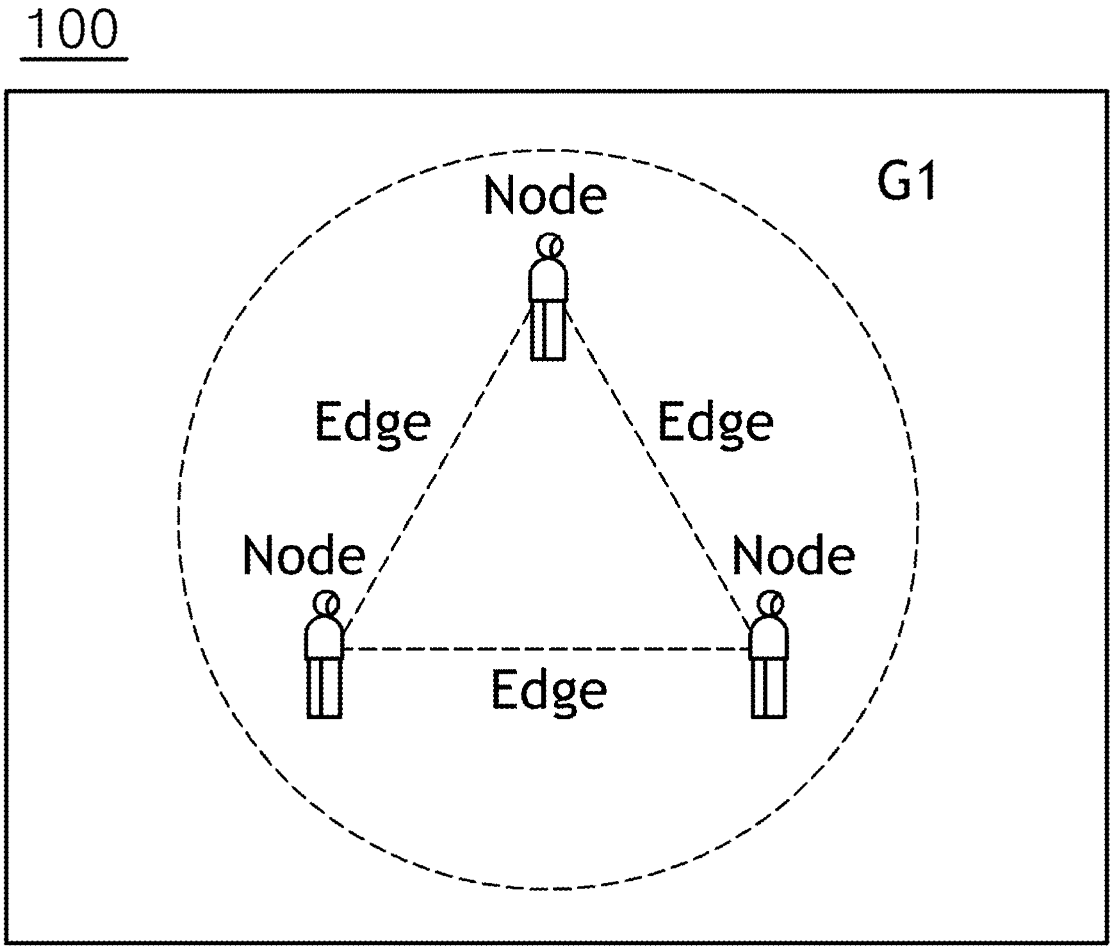
Figure 18:
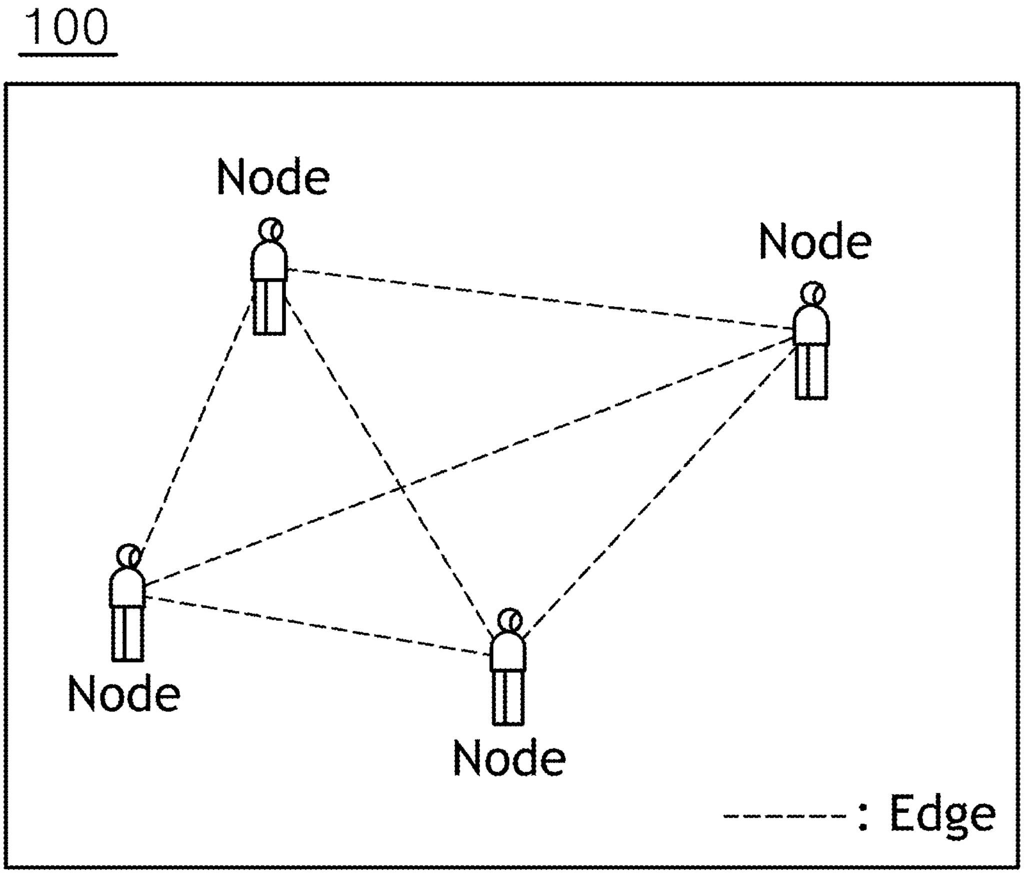

FIGS. 16 to 18 are diagrams for describing first to third graph data, respectively.

Figure 19:
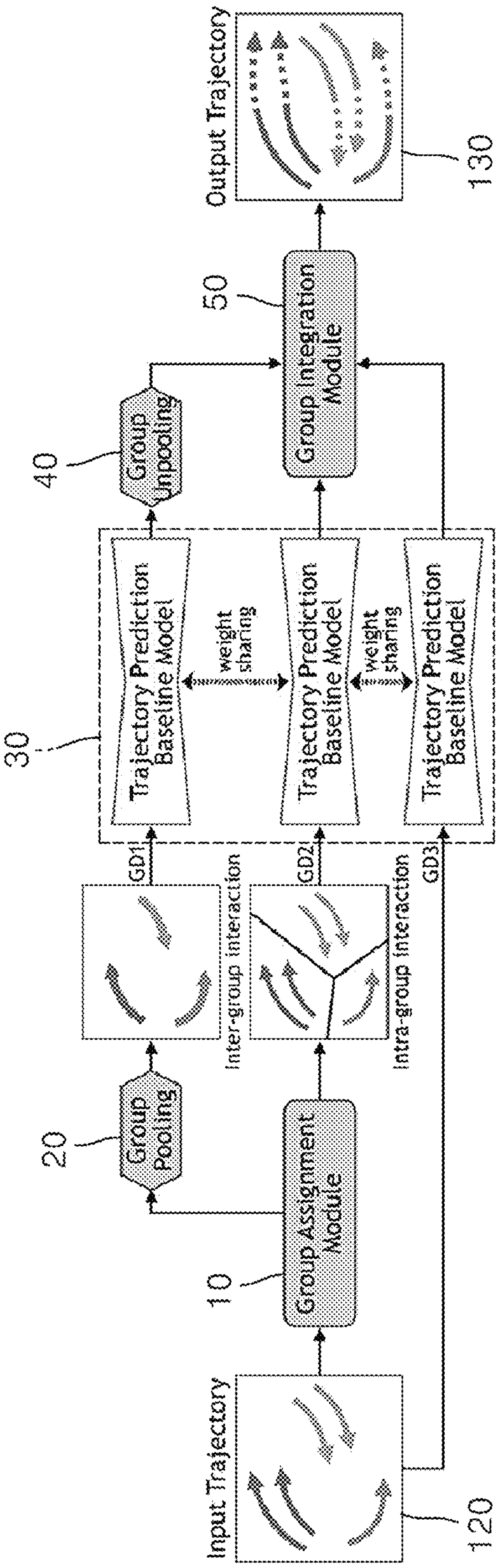
FIG. 19 is a diagram illustrating trajectory prediction architecture according to an exemplary embodiment of the present invention.

FIG. 19 is a diagram illustrating trajectory prediction architecture according to an exemplary embodiment of the present invention.

FIG. 20 is a diagram illustrating a capability comparison table according to whether to apply the present invention.

Referring to FIG. 12, the pedestrian trajectory prediction method according to an exemplary embodiment of the present invention may include a step (S100) of collecting a pedestrian image, a step (S200) of identifying pedestrian trajectories of a plurality of pedestrians in the pedestrian image, and a step (S300) of classifying the plurality of pedestrians into a pedestrian group.

Subsequently, the pedestrian trajectory prediction method may include a step (S410) of generating first graph data according to a relationship of the pedestrian group, a step (S420) of generating second graph data according to a relationship of the pedestrian in the pedestrian group, and a step (S430) of generating third graph data according to a total relationship of the plurality of pedestrians.

Subsequently, the pedestrian trajectory prediction method may include a step (S500) of inputting the first to third graph data into the neural network model and a step (S600) of generating an expected trajectory for each of the plurality of pedestrians. However, the pedestrian trajectory prediction method illustrated in FIG. 12 follows an exemplary embodiment, and respective steps that constitute the present invention are not limited to the exemplary embodiment, and as necessary, some steps may be added, modified, or deleted.

The respective steps illustrated in FIG. 12 may be performed by the processor such as a central processing unit (CPU), a graphics processing unit (GPU), etc., and the processor may further include at least physical element of application specific integrated circuits (ASICs), digital signal processors (DSPs), digital signal processing devices (DSPDs), programmable logic devices (PLDs), field programmable gate arrays (FPGAS), controllers, and micro-controllers.

Hereinafter, the respective steps illustrated in FIG. 12 will be described in detail.

The processor may collect a pedestrian image 100 including a plurality of pedestrians (S100).

The plurality of pedestrians may mean a pedestrian which becomes a target of trajectory prediction, and the pedestrian image 100 may be a predetermined image containing a figure in which the plurality of pedestrians moves. The pedestrian image 100 may be an image of various views, and for example, may be an image of a first person view (FPV) or an image of a surveillance view.

The processor may collect the pedestrian image 100 from the other device or a predetermined storage medium. For example, the processor may collect the pedestrian image 100 in front of a vehicle from the vehicle, and collect the pedestrian image 100 in a surveillance area from a CCTV, and collect the pedestrian image 100 from a predetermined database.

Subsequently, the processor may identify the pedestrian trajectories 120 of the plurality of pedestrians in the pedestrian image 100 (S200).

Referring back to FIG. 4 illustrating one example of the pedestrian image 100, the pedestrian trajectory 120 may mean a trajectory in which the pedestrian 110 moves in the pedestrian image 100, and may be identified in continuous frames. That is, the pedestrian trajectory 120 may be defined by a location of the pedestrian 110 continued according to the time.

The processor may detect a location of the pedestrian 110 for each frame of the pedestrian image 100, and identify the pedestrian trajectory 120 based on a location which is changed in time series. To this end, the processor may use a predetermined object detection algorithm known in the technical field.

Specifically, the processor may detect a specific body portion of the pedestrian 110, e.g., a location of a head for each frame, and connects the locations detected for each frame to identify the pedestrian trajectory 120.

Referring to FIG. 5, in the present invention, the expected trajectory 130 of the pedestrian 100 may be then determined based on the pedestrian trajectory 120 identified as described above. Specifically, in the present invention, based on the pedestrian trajectory 120 for a first time interval T1, the expected trajectory 130 of a second time interval T2 continued to the first time interval T1 may be determined.

In this regard, in the trajectory prediction model in the relate art, the individual pedestrians are focused, and it is expected that the interaction between the respective pedestrians will be sufficiently reflected through the graph-based neutral network models, such as Graph Convolutional Network (GCN), Graph Attention Network (GAT), Graph Transformer Network (GIN), etc. However, as the connection (edge) between the respective pedestrians (nodes) increases, it becomes very difficult for the neural network model to learn the complexity individual interactions, so there is a limit that trajectory prediction becomes very inaccurate in a complex environment.

In the present invention, by considering a social scientific research that more than 70% of the pedestrian forms a group, and the group forms a formation and walks to the same destination, a core value is to allow the neural network model to learn a group walking feature different from individual walks in predicting the trajectory of the pedestrian through an artificial intelligence neural network model.

To this end, the processor may classify the plurality of pedestrians into one pedestrian group based on the pedestrian trajectories 120 of the plurality of pedestrians (S300).

Referring to FIG. 13, there may be pedestrians I1 to I3 who walk individually and pedestrian groups G1 to G4 in which two or more pedestrians move in groups in the pedestrian image 100. In this case, the processor may classify pedestrians which form a predetermined formation into the same pedestrian group based on the pedestrian trajectory 120 of each pedestrian. Further, the processor may also classify the respective pedestrians which walk individually into the pedestrian group.

In one example, the processor may classify the plurality of pedestrians into one pedestrian group based on the distance between the pedestrian trajectories 120 of the plurality of pedestrians. As described above, since the pedestrian trajectory 120 is defined by continuous locations of the pedestrian, the distance between the pedestrian trajectories 120 may be the distance between the pedestrians according to the continued time.

Specifically, the processor may specify location coordinates of the plurality of pedestrians at each continued time, and calculate the distance between the pedestrians based on each location coordinate. In this case, the calculated distance may be the Euclidian distance (L2 distance), and the distance between the respective pedestrians may be calculated in the form of a pairwise matrix.

The processor may classify the plurality of pedestrians into the same pedestrian group when the distance between the pedestrian trajectories of the plurality of pedestrians is equal to or less than a reference value. In other words, when the distance between multiple pedestrians calculated in each continued time is equal to or less than a reference value, the processor may classify the corresponding pedestrians into the same pedestrian group.

When FIG. 14 is described as an example, the processor may calculate the distance between the respective pedestrians in the form of the pairwise matrix. In this case, a value of the matrix may have a binary value according to whether the distance between the pedestrians is equal to or less than the reference value, and the processor may classify the plurality of pedestrians into three pedestrian groups according to the binary value.

Specifically, referring to the matrix illustrated in FIG. 14, a distance between pedestrians #1 and #2 and a distance between pedestrians #3 and #5 may be equal to or less than a reference value, and all distances between other pedestrians other than pedestrian #4 may be more than the reference value. As a result, the processor may classify pedestrians #1 and #2 into one pedestrian group (k=1) and pedestrians #3 and #5 into the other one pedestrian group (k=2), and pedestrian #4 into a separate pedestrian group (k=3).

Meanwhile, the processor may classify the above-described pedestrian group by using the neural network. In one example, the processor may input the pedestrian trajectories 120 of the plurality of pedestrians into a grouping neural network that performs a classification operation, and the grouping neural network may classify the pedestrian group based on a distance between features of the pedestrian trajectories 120.

To this end, the grouping neural network may include a convolutional layer, and extract a feature from the pedestrian trajectories 120 of the plurality of pedestrians through the convolutional layer. Subsequently, the grouping neural network may calculate the distance between the extracted feature, and classify pedestrians in which the calculated distance is equal to or less than a reference value into the same pedestrian group.

Specifically, the grouping neural network may calculate a distance between features of pedestrian trajectories 120 for pedestrians of each pair (i, j) according to [Equation 6] below, and define an index $\gamma$ of a pedestrian set in which the distance between the features is equal to or less than the reference value according to [Equation 7] below, and generate a pedestrian group index G according to [Equation 8] below.

$$D_{i,j} = \|F_\phi(X_i) - F_\phi(X_j)\| \text{ for } i, j \in [1, \ldots, N], \qquad \text{[Equation 6]}$$

-continued $$X_n = \{(x_n^t, y_n^t) \mid t \in [1, \ldots, T_{obs}]\} \text{ for } n \in [1, \ldots, N]$$

$$\Upsilon = \{\text{pair}(i, j) \mid i, j \in [1, \ldots, N], i \neq j, D_{i,j} \leq \pi\} \quad \text{[Equation 7]}$$

$$G = \left\{G_k \mid G_k = \bigcup_{(i,j)\in\Upsilon} (i, j), G_a \cap G_b = \emptyset \text{ for } a \neq b\right\} \quad \text{[Equation 8]}$$

(In FIGS. 6 to 8, $F_\varphi(\bullet)$ represents the convolutional layer, N represents all pedestrians, $$(x_n^t, y_n^t)$$

represents the location of the pedestrian at a time t, I represents the reference value, and $G_k$ represents a k-th pedestrian group)

As described above, the grouping neural network may have a structure of generating the index of the pedestrian group discretely. In this case, since a function applied to the grouping neural network is impossible to be differentiated, the index of not be the pedestrian group may learned by a general backpropagation algorithm.

In the present invention, a straight-through estimator (STE) may be used so that the grouping neural network may be a learning target. Specifically, the processor may separate a forward pass and a backward pass of the grouping neural network in a learning process, and for example, in the process of the backward pass, the function applied to the grouping neural network may be approximated in a differentiable form by using a sigmoid function and a temperature coefficient t of the corresponding function.

Specifically, the processor may calculate a probability $A_{i,j}$ that the pedestrians of each pair (i, j) will belong to the same pedestrian group according to [Equation 9] below, and update the location of each pedestrian as in [Equation 10] below.

$$A_{i,j} = \frac{\dfrac{1}{1+\exp\left(\dfrac{D_{i,j}-\pi}{\tau}\right)}}{\sum_{i=1}^{N}\dfrac{1}{1+\exp\left(\dfrac{D_{i,j}-\pi}{\tau}\right)}} \text{ for } i, j \in [1, \ldots, N] \quad \text{[Equation 9]}$$

$$X' = \langle X - XA\rangle + XA \quad \text{[Equation 10]}$$

(In Equation 10, X' represents the updated location of the pedestrian, and <•> represents a detach function of PyTorch or a stop gradient function of Tensorflow)

As in the example, as the function applied to the grouping neural network is converted into the differential form, the gradient descent of reducing the loss function may be applied to the grouping neural network, and as a result, the parameters (weight and bias) applied to the grouping neural network may be learned.

Specifically, the parameters applied to the convolutional layer constituting the grouping neural network may be learned so that the index of the pedestrian group output from the grouping neural network is approximated to an actual pedestrian group (ground truth (GT)). Additionally, the processor may set the reference value I applied to [Equation 7] below as a learnable parameter, and in this case, the reference value π may also be learned so that the index of the pedestrian group output from the grouping neural network is approximated to the actual pedestrian group (ground truth (GT)).

When the pedestrian groups are classified according to the above-described method, the processor may predict the expected trajectory 130 of each pedestrian based on the pedestrian trajectories 120 of the pedestrian groups and the pedestrians in each pedestrian group.

Referring to FIG. 15, when the operation of the present invention is schematically described, the processor may receive the surveilled pedestrian trajectory 120 of each pedestrian as an input, and classify the respective pedestrians into pedestrian groups G1, G2, and G3 based on the received pedestrian trajectory 120. Subsequently, the processor may predict the expected trajectory 130 of each pedestrian by considering an inter-group interaction between the pedestrian groups G1, G2, and G3, and an intra-group interaction between the pedestrians in the pedestrian groups G1, G2, and G3.

The inter-group interaction and the intra-group interaction may be structuralized as the graph data, and the processor may generate first to third graph data in order to structuralize each interaction. Hereinafter, a method for generating each graph data and a method for predicting the pedestrian trajectory through the same will be described in detail.

The processor may generate the first graph data according to the relationship of each pedestrian group in order to structuralize the inter-group interaction (S410). In the present invention, the graph data as data constituted by the node and the edge may be data used as an input into the neural network model to be described below.

Referring to FIG. 16, the pedestrians in the pedestrian image 100 may be classified into the first to third pedestrian groups G1, G2, and G3. In this case, the processor sets each of the pedestrian groups G1, G2, and G3 as the node, and sets each connection between the groups G1, G2, and G3 as the edge to generate the first graph data.

Specifically, the processor pools the pedestrian trajectory 120 of the pedestrian which belongs to each pedestrian group, i.e., the location for each time to determine a representative location of each pedestrian group and set the representative location as the node. For example, when the processor uses an average pooling, a node $V_{group}$ corresponding to each pedestrian group may be set as in [Equation 11] below.

$$\mathcal{V}_{group}=\{\bar{X}_k | k\in[1, \ldots, K]\} \quad \text{[Equation 11]}$$

Subsequently, the processor may set the connection the representative locations of the respective pedestrian groups as an edge $\varepsilon_{group}$ according to [Equation 12] below.

$$\varepsilon_{group}=\{\bar{e}_{p,q} | p,q\in[1, \ldots, K]\} \quad \text{[Equation 12]}$$

(In Equations 11 and 12, k represents each pedestrian group) The processor may generate first graph data $G_{group}$ (hereinafter, referred to as GD1) as in [Equation 13] below according to the set node $V_{group}$ and edge $\varepsilon_{group}$.

$$\mathcal{G}_{group}=(\mathcal{V}_{group},\varepsilon_{group}) \quad \text{[Equation 13]}$$

As described above, according to the present invention, an interaction between pedestrian groups is structuralized with data to allow a neural network model to be described below to learn an intrinsic complexity of a social interaction. Further, since the number of nodes may be reduced as each pedestrian group is set as the node, a data biasing problem of the neural network model may be prevented.

Moreover, there is an advantage in that it is possible to flexibly cope with a change in the number of pedestrians in the pedestrian image 100 upon testing the neural network model. For example, even in the case where the neural network model is learned only a pedestrian image 100 including approximately 10 pedestrians, when a pedestrian image 100 including approximately 50 pedestrians is input into the neural network model at a test stage, if approximately 50 pedestrians are classified into approximately 10 pedestrian groups, prediction accuracy similar to the prediction accuracy upon the learning may be exhibited.

Meanwhile, the processor may generate the second graph data according to the relationship of the pedestrians in each pedestrian group in order to structuralize the intra-group interaction (S420).

Referring to FIG. 17, three pedestrians may be included in one pedestrian group G1. In this case, the processor sets each of the pedestrians in the pedestrian group G1 as the node, and sets each connection between the pedestrians as the edge to generate the second graph data.

Specifically, the processor may set a time-specific location of the pedestrian in the pedestrian group as a node $V_{ped}$ according to [Equation 14] below, and set each connection between the pedestrians as an edge $\varepsilon_{member}$ according to [Equation 15] below.

$$\mathcal{V}_{ped}=\{X_n|n\in[1, \ldots, N]\} \quad \text{[Equation 14]}$$

$$\varepsilon_{member}=\{e_{i,j}|i,j\in[1, \ldots, N],k\in[1, \ldots, K],\{i,j\}\subset G_k\} \quad \text{[Equation 15]}$$

(Here, K represent all pedestrian groups)

The processor may generate first graph data $G_{member}$ (hereinafter, referred to as GD2) as in [Equation 16] below according to the set node $V_{ped}$ and edge $\varepsilon_{member}$.

$$\mathcal{G}_{member}\ (\mathcal{V}_{ped},\varepsilon_{member}) \quad \text{[Equation 16]}$$

As described above, according to the present invention, the intra-group interaction is structuralized to prevent the expected trajectories 130 of the pedestrians in the same pedestrian group output from the neural network model to be described below from colliding with each other while maintaining predetermined formations and directions.

Meanwhile, the processor may generate the third graph data according to relationships of all pedestrians in order to structuralize the entire intra-group interaction (S430).

Referring to FIG. 18, four pedestrians may belong to different pedestrian groups. In other words, any pedestrian group may not include two or more pedestrians. In this case, the processor sets each of the pedestrians as the node, and sets each connection between the pedestrians as the edge to generate the third graph data.

Specifically, the processor may set time-specific locations of all pedestrians in the pedestrian group as the node $V_{ped}$ according to [Equation 14] described above, and set each connection between the pedestrians as the edge $\varepsilon_{edge}$ according to [Equation 17] below.

$$\varepsilon_{ped}=\{e_{i,j}|i,j\in[1, \ldots, N]\} \quad \text{[Equation 17]}$$

The processor may generate third graph data $G_{ped}$ (hereinafter, referred to as GD3) as in [Equation 18] below according to the set node $V_{ped}$ and edge $\varepsilon_{edge}$.

$$\mathcal{G}_{ped}=(\mathcal{V}_{ped},\varepsilon_{ped}) \quad \text{[Equation 18]}$$

As described above, according to the present invention, in one pedestrian image 100, each of an interaction between the pedestrian groups, an interaction between the pedestrians in the pedestrian group, and an interaction among all pedestrians is structuralized with the graph data to augment data at the time of learning the neural network model to be described below.

When the first to third graph data GD1, GD2, and GD3 are generated, the processor may input the first to third graph data GD1, GD2, and GD3 into the neural network model (S500), and generate the expected trajectory 130 for each of the plurality of pedestrians based on the output of the neural network model (S600).

Here, the neural network model as the neural network using the graph data described above as the input may include, for example, a Graph Convolutional Network (GCN), a Graph Attention Network (GAT), and a Graph Transformer Network (GIN).

The neural network model applied to the present invention may be learned to receive the first to third graph data GD1, GD2, and GD3 as the input, and output the expected trajectories 130 (classes) of all pedestrians, and an expected-trajectory (130)—specific occurrence probability (class-specific probability).

The processor may generate at least one of a plurality of expected trajectories 130 for each pedestrian output from the neural network model as the expected trajectory 130 of the pedestrian. For example, the processor may generate, as the expected trajectory 130, only trajectories selected as large as a predetermined number in the order of a higher probability among the plurality of excepted trajectories 130 (classes).

Meanwhile, in order to train all attributes included in the first to third graph data GD1, GD2, and GD3, respectively, the neural network model may include first to third graph based neural networks. In this case, the first to third graph based neural networks may include architecture such as the Graph Convolutional Network (GCN), the Graph Attention Network (GAT), the Graph Transformer Network (GIN), etc.

He first to third graph based neural networks may have different architectures, but preferably have the same architecture in order to increase a learning speed of each neural network through sharing parameters (hyperparameter and/or learnable parameter).

The processor may input the first to third graph data GD1, GD2, and GD3 into the first to third graph based neural networks sharing the parameters, respectively. Specifically, the processor may input the first graph data GD1 into the first graph based neural network, input the second graph data GD2 into the second graph based neural network, and input the third graph data into the third graph based neural network.

Subsequently, the processor may generate the expected trajectory 130 for each of the plurality of pedestrians by integrating the outputs of the first to third graph based neural networks.

The integration method may adopt various methods used in the technical field. For example, the processor may perform an element-wise summation or an element-wise product of the outputs of the first to third graph based neural networks. Further, the processor may perform an element-wise average of the outputs of the first to third graph based neural networks or combine respective outputs by using a multi-layer perceptron.

Meanwhile, the neural network model should output the expected trajectory 130 for each of all pedestrians, and since the first graph data GD1 is set with respect to the pedestrian group other than each pedestrian, the number of data (the number of pedestrian groups) output from the neural network model may not coincide with the number of pedestrians.

By considering this, the processor may unpool the output of the neural network model for the first graph data GD1 so that expected trajectories of pedestrians which belong to the same pedestrian group are the same as each other.

Specifically, a feature output from the first graph based neural network may correspond to the expected trajectory 130 of the pedestrian group. The processor may apply the feature corresponding to the pedestrian group to all pedestrians which belong to the corresponding pedestrian group through an unpooling technique so that all pedestrians included in the pedestrian group have the same expected trajectory 130.

That is, when FIG. 16 is described as an example, the first graph based neural network may output expected trajectories 130 of the first to third pedestrian groups G1, G2, and G3. Meanwhile, since the neural network model should output the expected trajectory 130 for each of all pedestrians, the processor may unpool the output of the first graph based neural network so that the expected trajectory 130 of the first pedestrian group G1 are applied to all of three pedestrians included in the first pedestrian group G1 and the expected trajectories 130 of the second and third pedestrian groups G2 and G3 are equally applied to two pedestrians included in the second and third pedestrian groups G2 and G3, respectively.

Meanwhile, referring back to FIG. 14, the actual trajectory of the pedestrian 110 may be determined informally according to the latent intention of the pedestrian at the second time interval T2. In order to reflect this on the learning of the neural network model, the processor samples latent vectors corresponding to intentions of the plurality of pedestrians 110, and inputs the latent vectors and the first to third graph data GD1, GD2, and GD3 into the neural network model to generate the expected trajectory 130.

Specifically, the processor may randomly sample the latent vectors according to the random vector determined according to the Monte Carlo or a Quasi-Monte Carlo method. Since each latent vector corresponds to a latent intention of the pedestrian, i.e., the expected trajectory 130, the processor may sample the latent vectors as large as the number of expected trajectories 130 to be determined through the neural network model.

Additionally, the processor may sample the latent vector according to the pedestrian group in order to reflect a group feature of the pedestrian group. Specifically, the processor may sample the same latent vector with respect to the pedestrians which belong to the same pedestrian group.

When FIG. 16 is described as an example again, the processor may sample the same latent vector with respect to three pedestrians which belong to the first pedestrian group G1, sample the same latent vector with respect to two pedestrians which belong to the second pedestrian group G2, and sample the same latent vector with respect to two pedestrians which belong to the third pedestrian group G3, in sampling the pedestrians which belong to each of the pedestrian groups G1, G2, and G3. In this case, each of the latent vectors set with respect to each of the pedestrian groups G1, G2, and G3 may be randomly sampled.

When the latent vector is sampled by such a method, the neural network model may learn a social statistical feature that the pedestrians in the same pedestrian group move toward the same destination.

Hereinafter, trajectory prediction architecture and an operation process thereof according to an exemplary embodiment of the present invention will be described with reference to FIG. 19. Referring to FIG. 19, the processor I identify the pedestrian trajectory 120 of each pedestrian in the pedestrian image 100, and input the identified pedestrian trajectory 120 into a group assignment module 10. The group assignment module may classify the plurality of respective pedestrians into the pedestrian group through the grouping neural network.

The processor pools (20) the pedestrian trajectories 120 of the pedestrians which belong to each pedestrian group to determine a representative location of each pedestrian group, and generate the first graph data GD1 based on the relationship between the representative locations. Further, the processor may generate the second graph data GD2 according to a location relationship of the pedestrians in each pedestrian group, and generate the third graph data GD3 according to a location relationship of individual pedestrians regardless of the pedestrian group.

The neural network model 300 applied to the present invention may include the first to third graph based neural networks (trajectory prediction baseline models, and the processor may input the first graph data GD1 into the first graph based neural network, the second graph data GD2 into the second graph based neural network, and the third graph data GD3 into the third graph based neural network, respectively.

Since the number of data output from the first graph based neural network corresponds to the number of pedestrian groups, the processor may unpool (40) the corresponding output and convert the unpooled output so that the number of data output from the first graph based neural network corresponds to the number of pedestrians, and then input the outputs of the first to third graph based neural networks into a group integration module 50.

The group integration module may integrate the outputs of the first to third graph based neural networks through the method such as the element-wise summation, the element-wise product, the element-wise averaging, a data combination using the multi-layer perceptron, etc., and the processor may generate each pedestrian-wise expected trajectory 130 according to integrated data.

FIG. 20 illustrates capabilities (ADE, FD3, COL, and TCC) when the present invention reflecting a social feature of the pedestrian group is applied to various neural network models (STGCNN, SGCN, STAR, and Percent) in the related art for predicting the pedestrian trajectory with respect datasets (ETH, HOTEL, UNIV, ZARA1, and ZARA2) generally used for benchmark. As illustrated in FIG. 20, it may be confirmed that when the architecture is coupled to any neural network model, the capability is significantly enhanced.

As described above, the present invention is described with reference to the exemplified drawing, but the present invention is not limited by the exemplary embodiments and drawings disclosed in this specification, and it is apparent that that various modifications can be made by those skilled in the art without the scope of the technical spirit of the present invention. In addition, it is natural that even though an action effect according to the configuration of the present invention is explicitly disclosed and described while describing the exemplary embodiments of the present invention, predictable effects should also be accepted by the corresponding configuration.

What is claimed is:

1. A method for predicting a pedestrian trajectory, performed by a processor, the method comprising:

collecting, by the processor, pedestrian images from a Closed-Circuit Television (CCTV) or a predetermined database;

identifying, by the processor, the pedestrian trajectory of a target pedestrian in the pedestrian images;

sampling, by the processor, based on the pedestrian trajectory of the target pedestrian, a predetermined number of latent vectors among a plurality of random vectors, which are determined according to a Monte Carlo or a Quasi-Monte Carlo method and are corresponding to an intention of the target pedestrian non-stochastically;

extracting, by the processor, a pedestrian feature vector from the pedestrian trajectory;

determining, by the processor, an expected trajectory of the target pedestrian by applying the pedestrian feature vector and the latent vectors to a neural network model; and outputting, by the processor, the expected trajectory of the target pedestrian by applying the pedestrian feature vector and the latent vector to one of Gaussian distribution, Generative Adversarial Network (GAN), and Conditional Variational AutoEncoder (CVAE), and calculating and outputting, by the processor, an occurrence probability of the expected trajectory, wherein the sampling of the latent vectors non-stochastically includes sampling the predetermined number of latent vectors so that a distance between respective trajectories predicted by the plurality of random vectors are largest while the trajectories predicted by the plurality of random vectors are most similar to an actual trajectory of the target pedestrian.

2. The method of claim 1, wherein the identifying comprises:

detecting a location of the target pedestrian for each frame, and identifying the pedestrian trajectory.

3. The method of claim 1, wherein the sampling of the latent vectors non-stochastically further includes sampling the predetermined number of latent vectors in an order in which trajectories predicted by the plurality of random vectors are most similar to the actual trajectory of the target pedestrian upon learning the neural network model.

4. The method of claim 3, wherein the sampling of the latent vectors non-stochastically further includes sampling the predetermined number of latent vectors by applying a loss function which decreases as the trajectories predicted by the plurality of random vectors are more similar to the actual trajectory of the target pedestrian to the neural network model.

5. The method of claim 1, wherein the sampling of the latent vectors non-stochastically includes applying, to the neural network model, a final loss function acquired by a linear combination of a first loss function decreases as the trajectories predicted by the plurality of random vectors are more similar to the actual trajectory of the target pedestrian and a second loss function decreases as the distance between the respective trajectories predicted by the plurality of random vectors is larger to sample the predetermined number of latent vectors.

6. The method of claim 1, wherein the sampling of the latent vectors non-stochastically further includes extracting an interaction-aware feature between the target pedestrian and a surrounding pedestrian, and reflecting the interaction-aware feature to sample the latent vector.

7. The method of claim 6, wherein the extracting of the interaction-aware feature includes extracting the interaction-aware feature through a graph attention network (GAT), and inputting the interaction-aware feature into a multi-layer perceptron (MLP) to sample the latent vector.

8. The method of claim 1, wherein the neural network model is learned by using a training dataset constituted by the pedestrian trajectory of the target pedestrian for a first time interval of the pedestrian image and the pedestrian trajectory of the target pedestrian for a second time interval continued to the first time interval.

9. A method for predicting a pedestrian trajectory, performed by a processor, the method comprising:

collecting, by the processor, pedestrian images from a Closed-Circuit Television (CCTV) or a predetermined database;

identifying, by the processor, the pedestrian trajectory of a target pedestrian in the pedestrian images;

sampling, by the processor, based on the pedestrian trajectory of the target pedestrian, a predetermined number of latent vectors among a plurality of random vectors, which are determined according to a Monte Carlo or a Quasi-Monte Carlo method and are corresponding to an intention of the target pedestrian non-stochastically;

extracting, by the processor, a pedestrian feature vector from the pedestrian trajectory;

determining, by the processor, an expected trajectory of the target pedestrian by applying the pedestrian feature vector and the latent vectors to a neural network model; and outputting, by the processor, the expected trajectory of the target pedestrian by applying the pedestrian feature vector and the latent vector to one of Gaussian distribution, Generative Adversarial Network (GAN), and Conditional Variational AutoEncoder (CVAE), and calculating and outputting, by the processor, an occurrence probability of the expected trajectory, wherein the sampling of the latent vectors non-stochastically includes sampling the predetermined number of latent vectors in an order in which a distance between respective trajectories predicted by the plurality of random vectors are largest upon learning the neural network model, and wherein the sampling of the latent vectors non-stochastically includes sampling the predetermined number of latent vectors by applying a loss function which decreases as the distance between the respective trajectories predicted by the plurality of random vectors to the neural network model.

* * * * *